(12) United States Patent
Guha et al.

(10) Patent No.: US 9,753,778 B2
(45) Date of Patent: Sep. 5, 2017

(54) DOMAIN-AGNOSTIC RESOURCE ALLOCATION FRAMEWORK

(75) Inventors: Saikat Guha, Bangalore (IN); Ranjita Bhagwan, Bangalore (IN); Anshul Rai, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 13/553,847

(22) Filed: Jul. 20, 2012

(65) Prior Publication Data
US 2014/0025822 A1 Jan. 23, 2014

(51) Int. Cl.
*G06F 15/173* (2006.01)
*G06F 9/50* (2006.01)

(52) U.S. Cl.
CPC .................. *G06F 9/5038* (2013.01)

(58) Field of Classification Search
CPC ..... G06F 2213/2806; G06F 2212/7202; G06F 2212/6042; G06F 3/1296; G06F 8/441; G06F 9/50; G06F 9/5094; G06F 11/3006; G06F 11/3017; G06F 11/3433; G06F 12/02; G06F 12/0223; G06F 2009/45583; G06F 9/5016
USPC .......................................................... 709/226
See application file for complete search history.

(56) References Cited

U.S. PATENT DOCUMENTS

| 8,041,773 B2 * | 10/2011 | Abu-Ghazaleh | G06F 15/16 709/209 |
| 8,141,075 B1 * | 3/2012 | Chawla | G06F 9/45558 718/1 |
| 8,214,829 B2 * | 7/2012 | Neogi | G06F 1/3203 713/300 |

(Continued)

OTHER PUBLICATIONS

Bellur, Umesh; Rao, Chetan S; SD, Madhu Kumar, Optimal Placement Algorithms for Virtual Machines, Nov. 2010, Cornell University Library, eprint arXiv:1011.5064, 2010arXiv1011.5064B, Computer Science—Distributed, Parallel, and Cluster Computing, C.2.4, G.1.6 , pp. 1-16.*

(Continued)

*Primary Examiner* — Krista Zele
*Assistant Examiner* — Tariq Najee-Ullah
(74) *Attorney, Agent, or Firm* — Katrina A. Lyon; Lyon & Harr, LLP

(57) ABSTRACT

A resource allocation framework is described herein which allocates items (conceptualized as balls) to item-receiving slots (conceptualized as bins) in a domain-agnostic manner. A user instantiates the resource allocation framework to a particular allocation problem by generating a specification that describes the allocation problem in a declarative fashion. Among other features, the specification maps real-world entities to the balls and bins, and describes the constraints associated with the allocation problem. The specification also provides a utilization function that computes the consumption of resources for a proposed assignment of a particular ball to a particular bin. According to another (Continued)

(Continued in Fig. 8)

aspect, the resource allocation framework uses many processing elements (e.g., GPU threads, CPU threads, etc.), operating in parallel, to attempt to find a solution to the allocation problem. In this search for a solution, the resource allocation framework operates in any combination of an explore mode and an exploit mode.

20 Claims, 17 Drawing Sheets

(56) References Cited

U.S. PATENT DOCUMENTS

| | | | | |
|---|---|---|---|---|
| 8,380,846 | B1* | 2/2013 | Abu-Ghazaleh | G06F 15/16 706/13 |
| 8,458,114 | B2* | 6/2013 | Vigoda | G06N 7/005 706/52 |
| 2004/0064438 | A1* | 4/2004 | Kostoff | 707/1 |
| 2007/0060158 | A1* | 3/2007 | Medepalli | H04W 72/085 455/450 |
| 2009/0083390 | A1* | 3/2009 | Abu-Ghazaleh | G06F 15/16 709/209 |
| 2009/0228443 | A1* | 9/2009 | Lapin et al. | 707/3 |
| 2009/0254572 | A1* | 10/2009 | Redlich et al. | 707/10 |
| 2010/0036747 | A1* | 2/2010 | Bagley et al. | 705/26 |
| 2010/0070695 | A1* | 3/2010 | Baek | G06F 12/023 711/104 |
| 2010/0107172 | A1* | 4/2010 | Calinescu | G06F 9/5061 718/104 |
| 2010/0180275 | A1* | 7/2010 | Neogi | G06F 1/3203 718/1 |
| 2010/0250744 | A1* | 9/2010 | Hadad | G06F 9/4856 709/226 |
| 2011/0029347 | A1* | 2/2011 | Kozat et al. | 705/8 |
| 2013/0263120 | A1* | 10/2013 | Patil | G06F 9/45558 718/1 |

OTHER PUBLICATIONS

Liu, et al., "Cloud Resource Orchestration: A Data-Centric Approach," retrieved at <<http://www.research.att.com/export/sites/att_labs/techdocs/TD_100222.pdf>>, Proceedings of the Conference on Innovative Data System Research, Nov. 9, 2011, 7 pages.

Liu, et al., "Declarative Automated Cloud Resource Orchestration," retrieved at <<http://netdb.cis.upenn.edu/papers/cope.pdf>>, Proceedings of the 2nd ACM Symposium on Cloud Computing, Oct. 2011, 8 pages.

Liu, et al., "Cologne: A Declarative Distributed Constraint Optimization Platform," retrieved at <<http://www.cis.upenn.edu/~changbl/pubs/Cologne_A_Declarative_Distributed_Constraint_Optimization_Platform.pdf>>, Proceedings of the VLDB Endowment VLDB Endowment, vol. 5, Issue 8, Apr. 2012, 12 pages.

Lee, et al., "Validating Heuristics for Virtual Machines Consolidation," retrieved at <<http://research.microsoft.com/pubs/144571/virtualization.pdf>>, Microsoft Research Technical Report No. MSR-TR-2011-9, Jan. 2011, Microsoft Corporation, Redmond, WA, 14 pages.

Padala, et al., "Adaptive Control of Virtualized Resources in Utility Computing Environments," retrieved at <<http://wsn.cse.wustl.edu/images/3/35/Virtual-eurosys07.pdf>>, Proceedings of the 2nd ACM SIGOPS/EuroSys European Conference on Computer Systems 2007, Mar. 21, 2007, 14 pages.

"Windows Azure," retrieved at <<http://en.wikipedia.org/wiki/Windows_Azure>>, Wikipedia article, retrieved on Jul. 18, 2012, 7 pages.

Al-Fares, et al., "A Scalable, Commodity Data Center Network Architecture," retrieved at <<http://acm.org>>, Proceedings of the ACM SIGCOMM 2008 Conference on Data Communication, Aug. 2008, pp. 63-74.

Rosen, Guy, "Anatomy of an Amazon EC2 Resource ID," retrieved at <<http://www.jackofallclouds.com/2009/09/anatomy-of-an-amazon-ec2-resource-id/>>, Sep. 21, 2009, 16 pages.

Apt, et al., Constraint Logic Programming using ECLiPSe, retrieved at <<http://www.inf.ucv.cl/~bcrawford/Constraint-Logic-Programming-using-Eclipse.9780521866286.32725.pdf>>, Cambridge University Press, 2007, 349 pages.

Ballani, et al., "Towards Predictable Datacenter Networks," retrieved at <<http://conferences.sigcomm.org/sigcomm/2011/papers/sigcomm/p242.pdf>>, Proceedings of the ACM SIGCOMM 2011 Conference, Aug. 15, 2011, pp. 242-253.

Benson, et al., "CloudNaas: A Cloud Networking Platform for Enterprise Applications," retrieved at <<http://pages.cs.wisc.edu/~tbenson/papers/CloudNaaS.pdf>>, Proceedings of the 2nd ACM Symposium on Cloud Computing, Oct. 27, 2011, 13 pages.

Chandra, et al., "DirCast: A Practical and Efficient Wi-Fi Multicast System," retrieved at <<http://research.microsoft.com/en-us/um/people/moscitho/Publications/ICNP2009.pdf>>, Proceedings of the 17th Annual IEEE International Conference on Network Protocols, Oct. 13, 2009, pp. 161-170.

Moura, et al., "Z3: An Efficient SMT Solver," retrieved at <<http://vmg.pp.ua/books/>>, Proceedings of the Theory and Practice of Software, 14th International Conference on Tools and Algorithms for the Construction and Analysis of Systems, TACAS 2008, LNCS vol. 4963, 2008, pp. 337-340.

Epstein, et al., "On Bin-Packing with Conflicts," retrieved at <<http://citeseerx.ist.psu.edu/viewdoc/download?doi=10.1.1.105.3901&rep=rep1&type=pdf>>, Proceedings of the 4th International Workshop on Approximation and Online Algorithms, Sep. 2006, 25 pages.

Guo, et al., "Secondnet: A Data Center Network Virtualization Architecture with Bandwidth Guarantees," retrieved at <<http://www.stanford.edu/~shyang/Site/home_files/15-Guo.pdf>>, Proceedings of the 6th International ACM CoNEXT Conference, Nov. 30, 2010, 12 pages.

"HDFS Architecture," retrieved at <<http://hadoop.apache.org/common/docs/r0.20.0/hdfs_design.html>>, Apache™ Hadoop™ project, The Apache Software Foundation, last published Apr. 8, 2009, 8 pages.

Han, et al., "PacketShader: A GPU-Accelerated Software Router," retrieved at <<http://acm.org>>, Proceedings of the ACM SIGCOMM 2010 Conference, Sep. 2010, pp. 195-206.

Jang, et al., "SSLShader: Cheap SSL Acceleration with Commodity Processors," retrieved at <<http://static.usenix.org/event/nsdi11/tech/full_papers/Jang.pdf>>, Proceedings of the 8th USENIX Conference on Networked Systems Design and Implementation, Mar. 2011, 14 pages.

Lee, et al., "Topology-Aware Resource Allocation for Data Intensive Workloads," retrieved at <<http://conferences.sigcomm.org/sigcomm/2010/papers/apsys/p1.pdf>>, Proceedings of the First ACM Asia-pacific Workshop on Systems, Aug. 30, 2010, 5 pages.

Coffman, et al., "Approximation Algorithms for Bin Packing: A Survey," in Approximation Algorithms for NP-hard Problems, D. Hochbaum (ed.), 1996, 53 pages.

"Microsoft Assessment and Planning Toolkit," retrieved at <<http://technet.microsoft.com/en-us/solutionaccelerators/dd537566.aspx>>, retrieved on Jul. 19, 2012, Microsoft Corporation, Redmond, WA, 2 pages.

"Microsoft System Center Virtual Machine Manager," retrieved at <<http://www.microsoft.com/en-us/server-cloud/system-center/default.aspx>>, retrieved on Jul. 18, 2012, Microsoft Corporation, Redmond, WA, 2 pages.

Mudigonda, et al., "SPAIN: COTS Data-Center Ethernet for Multipathing Over Arbitrary Topologies," retrieved at <<http://static.usenix.org/event/nsdi10/tech/full_papers/mudigonda.pdf>>, Proceedings of the 7th USENIX Conference on Networked Systems Design and Implementation, Apr. 28, 2010, 16 pages.

Narain, et al., "Declarative Infrastructure Configuration Synthesis and Debugging," retrieved at <<http://www.argreenhouse.com/papers/narain/DeclarativeConfiguration.pdf>>, Journal of Network and Systems Management, vol. 16, Issue 3, Sep. 2008, 26 pages.

(56) References Cited

OTHER PUBLICATIONS

Oppenheimer, et al., "Distributed Resource Discovery on PlanetLab with SWORD," retrieved at <<http://sword.cs.williams.edu/pubs/worlds04.pdf>>, Proceedings of the WORLDS, Dec. 5, 2004, 5 pages.
Peterson, et al., "Antfarm: Efficient Content Distribution with Managed Swarms," retrieved at <<http://static.usenix.org/event/n5di09/tech/full_papers/peterson/peterson.pdf>>, Proceedings of the 6th USENIX Symposium on Networked Systems Design and Implementation, Apr. 22, 2009, pp. 107-122.
Stillwell, et al., "Resource Allocation Algorithms for Virtualized Service Hosting Platforms," retrieved at <<http://perso.ens-lyon.fr/frederic.vivien/Publications/JPDC-2010-SSVC.pdf>>, Journal of Parallel and Distributed Computing, vol. 70, May 2010, pp. 962-974.
Sung, et al., "Towards Systematic Design of Enterprise Networks," retrieved at <<http://citeseerx.ist.psu.edu/viewdoc/download?doi=10.1.1.183.3237&rep=rep1&type=pdf>>, Proceedings of the 2008 ACM CoNEXT Conference, Dec. 10, 2008, 12 pages.
Torlak, et al., "Kodkod: A Relational Model Finder," retrieved at <<http://alloy.mit.edu/community/files/tacas07-torlak.pdf>>, Proceedings of the 13th International Conference on Tools and Algorithms for the Construction and Analysis of Systems, Mar. 24, 2007, 15 pages.
Yin, et al., "Rhizoma: A Runtime for Self-Deploying, Self-Managing Overlays," retrieved at <<http://www.inf.ethz.ch/personal/troscoe/pubs/middleware09-rhizoma.pdf>>, Proceedings of the ACM/IFIP/USENIX 10th International Conference on Middleware, Dec. 2009, 20 pages.
Yu, et al., "Rethinking Virtual Network Embedding: Substrate Support for Path Splitting and Migration," retrieved at <<http://www.eecs.berkeley.edu/~minlanyu/writeup/CCR08.pdf>>, ACM SIGCOMM Computer Communication Review, vol. 38, Issue 2, Apr. 2008, 11 pages.
Garey, et al., Computers and Intractability: A Guide to the Theory of NP-Completeness, W.H. Freeman and Company, New York, NY, 1979, pp. 13, 18-19, 29, 80-90, 114, 156-157.
Manolios, et al., "Implementing Survey Propagation on Graphics Processing Units," retrieved at <<http://citeseerx.ist.psu.edu/viewdoc/download?doi=10.1.1.91.2858&rep=rep1&type=pdf>>, Proceedings of the 9th international Conference on Theory and Applications of Satisfiability Testing, 2006, 14 pages.
Moskewicz, et al., "Chaff: Engineering an Efficient SAT Solver," retrieved at <<http://acm.org>>, Proceedings of the 38th Annual Design Automation Conference, 2001, pp. 530-535.
International Search Report and Written Opinion for PCT/US2013/051177, mailed on Feb. 6, 2014, 12 pages.
Fages, et al., "From Rules to Constraint Programs with the Rules2CP Modelling Language," Lecture Notes in Computer Science, vol. 5655, 2009, 18 pages.
Solotorevsky, et al., "Specifying Resource Allocation and Time-Tabling Problems using a Rule-based Language," Proceedings of Computer Systems and Software Engineering, 1991, 9 pages.
Patt-Shamir, et al., "Vector bin packing with multiple-choice," Discrete Applied Mathematics, vol. 160, No. 10, 2012, 10 pages.
"Office Action Issued in European Patent Application No. 13748386.3", Mailed Date: Jan. 26, 2016, 7 Pages.
"Office Action Issued in European Patent Application No. 13748386.3", Mailed Date: Sep. 5, 2016, 6 Pages.
"Office Action Issued in European Patent Application No. 13748386.3", Mailed Date: Jan. 12, 2017, 6 Pages.
"Brute-Force Search", Retrieved form <<https://en.wikipedia.org/w/index.php?title=Bruteforce_search&oldid=499561810>>, Jun. 27, 2012, 4 Pages.
"Office Action Issued in European Patent Application No. 13748386.3", dated Apr. 20, 2016, 5 Pages.

\* cited by examiner (CONTINUED IN FIG. 8)

TABLE 1
VM REQUIREMENTS

| VM | CPU | Mem |
|---|---|---|
| VM0 | 100 | 2 |
| VM1 | 50 | 3 |
| VM2 | 40 | 4 |
| VM3 | 40 | 4 |

TABLE 2
SERVER CAPACITY

| Server | CPU | Mem |
|---|---|---|
| S0 | 100 | 5 |
| S1 | 200 | 10 |

ILLUSTRATIVE SPECIFICATION 1

1: BALLS {0 → VM0; 1 → VM1; 2 → VM2; 3 → VM3}

2. BINS {0 → S0; 1 → S1}

3. RESOURCES {0 → ($S0_{CPU}$, 100); 1 → ($S0_{MEM}$, 5);
4.                2 → ($S1_{CPU}$, 200); 3 → ($S1_{MEM}$, 10)}

5. procedure UTILFN(BALL, BIN, ALLOC)

6.     UTILDATA: {0 → 100; 1 → 2;    /* VM0 REQ. */
7.                2 → 50;  3 → 3;    /* VM1 REQ. */
8.                4 → 40;  5 → 4;    /* VM2 REQ. */
9.                6 → 40;  7 → 4}   /* VM3 REQ. */

10.    UTIL ← {0, 0, 0, 0}
11.    UTIL[BIN × 2] ← UTILDATA[BALL × 2]
12.    UTIL[BIN × 2 + 1] ← UTILDATA[BALL × 2 + 1]
13. return UTIL

14. FOES: [{VM2, VM3}]

} UTILIZATION FUNCTION

FIG. 9

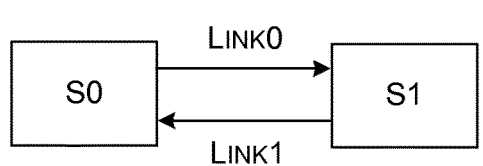

ILLUSTRATIVE SPECIFICATION 2
(EXCERPT)

```
...

1. RESOURCES { . . . 4 → (LINK0, 150); 5 → (LINK1, 100)};
   ...

2. procedure UTILFN(BALL, BIN, ALLOC)
       ...

3.     BW: {0 → {0, 10, 0, 0};     /* VM0 TRAFFIC */
4.          1 → {20, 0, 0, 0};      /* VM1 TRAFFIC */
5.          2 → {0, 0, 0, 50};      /* VM2 TRAFFIC */
6.          3 → {0, 0, 50, 0}}      /* VM3 TRAFFIC */

7.     PATH: {0 → {1 → [4, 5]};    /* S0 → S1 PATH */
8.            1 → {0 → [5, 4]}}    /* S1 → S0 PATH */

9.     for all OBALL in 0 . . . 3 except BALL do
10.        OBIN ← ALLOC[OBALL]
11.        if OBIN ≠ NULL and OBIN ≠ BIN then
12.            for all LINK in PATH[BIN][OBIN] do
13.                UTIL[LINK] ±← BW[BALL][OBALL]
14.            for all LINK in PATH[OBIN][BIN] do
15.                UTIL[LINK] ±← BW[OBALL][BALL]

...
```

} UTILIZATION FUNCTION

FIG. 10

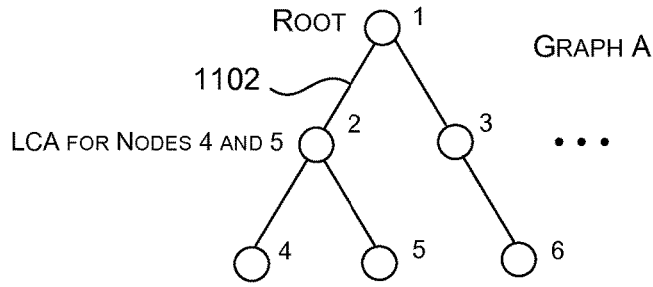

ILLUSTRATIVE SPECIFICATION 3
(EXCERPT)

```
...

7.    for all OBALL in 0 ... 3 except BALL do
8.        OBIN ← ALLOC[OBALL]
9.        if OBIN ≠ NULL and OBIN ≠ BIN then
10.           for all LINK in PATHTOLCA[BIN][OBIN] do
11.               UTIL[LINK] ±← BW[BALL][OBALL] + BW[OBALL][BALL]
12.       if OBIN == NULL then
13.           for all LINK in PATHTOROOT[BIN] do
14.               UTIL[LINK] ±← BW[BALL][OBALL] + BW[OBALL][BALL]
15.       if OBIN ≠ NULL and OBIN == BIN then
16.           for all LINK in PATHTOROOT[BIN] do
17.               UTIL[LINK] ←− BW[BALL][OBALL] + BW[OBALL][BALL]

DOMAIN-AGNOSTIC RESOURCE ALLOCATION FRAMEWORK

BACKGROUND

There are many occasions when it is necessary to allocate items to bins in a manner that satisfies a specified set of constraints. For example, in the management of a data center, it is necessary to allocate virtual machines (VMs) to servers, subject to the resource requirements of the VMs and the resource capacities of the servers in the data center. Allocation problems can be complex in nature. For this reason, the research community has developed various algorithms to solve different kinds of allocation problems.

Many allocation algorithms are governed by heuristics. However, heuristic-based algorithms have a number of drawbacks. First, a heuristic-based algorithm applies to only the specific allocation problem for which it was devised. Second, a heuristic-based algorithm may become outdated if the allocation problem changes. For example, a data center may evolve to incorporate new technology. Or an administrator may redefine allocation objectives, and/or reconfigure the architecture of a data center to better satisfy changing market demands. As a result of these changes, a heuristic-algorithm may no longer accurately model the data center. This, in turn, may force an engineer to revise the heuristic of the allocation framework, potentially requiring a significant amount of work.

SUMMARY

A resource allocation framework (RAF) is described herein which allocates items (conceptualized as balls) to item-receiving slots (conceptualized as bins). A user instantiates the RAF to a particular allocation problem by generating a specification. The specification describes the allocation problem in a declarative manner. For instance, the specification maps real-word entities to the balls and bins, and describes the constraints associated with the allocation problem. The specification also provides a utilization function that computes the consumption of resources for a proposed assignment of a particular ball to a particular bin.

On the other hand, the core abstractions of the RAF remain domain-agnostic with respect to different allocation problems. Hence, a user can adapt the RAF to a new allocation problem in a convenient manner by writing a new specification for that problem, without revising the abstractions of the RAF.

According to another illustrative aspect, the RAF uses plural processing elements that perform a parallel search for a solution to the allocation problem. For example, the processing elements may correspond to threads provided by a graphical processing unit (GPU) or a multi-core central processing unit (CPU), etc.

According to another illustrative aspect, the resource allocation framework operates using any combination of an explore mode and an exploit mode, described further in the Detailed Description section.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 9-11 show three specifications used to describe three respective allocation problems.

Figure 1:
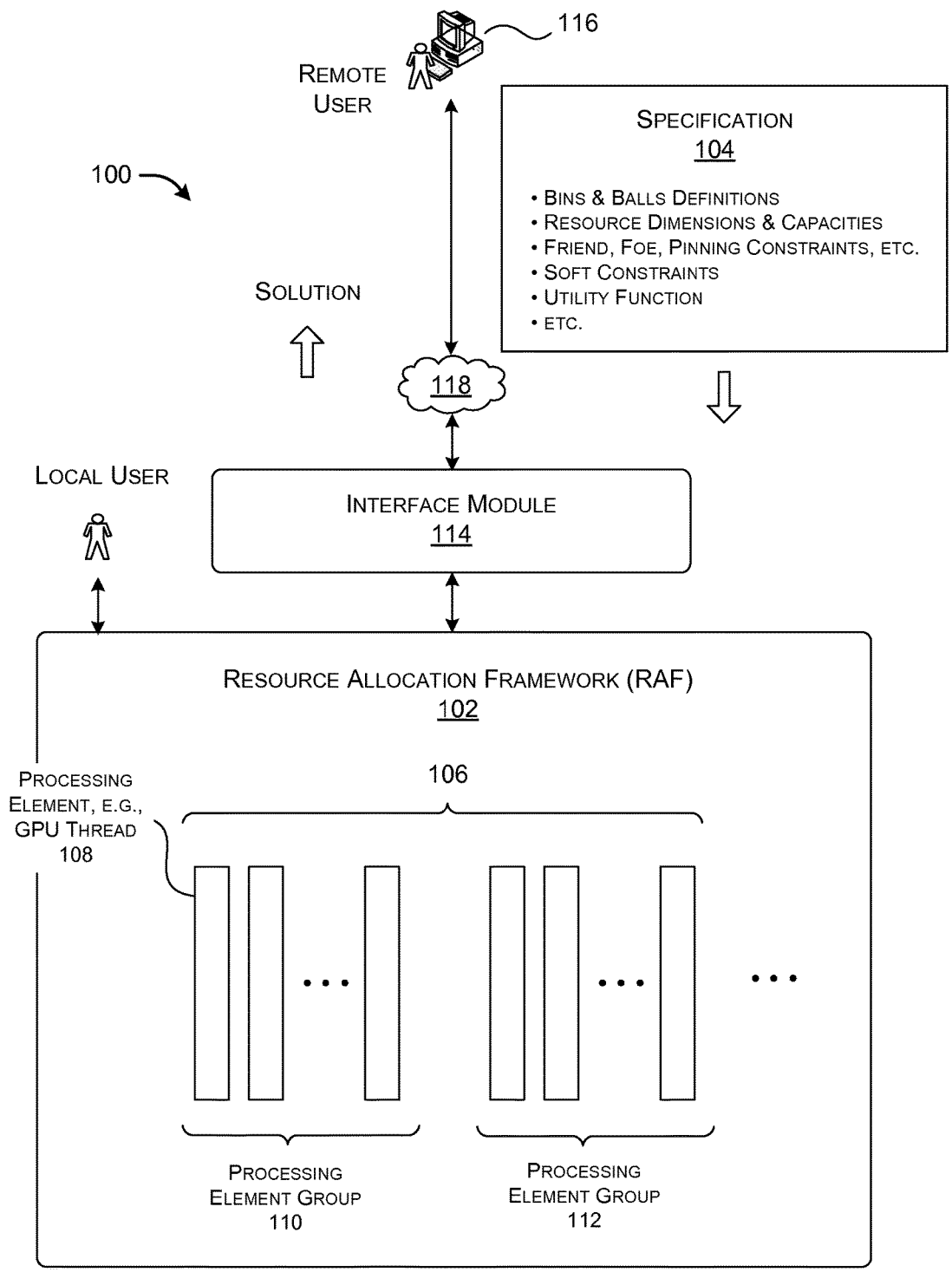
FIG. 1 shows an overview of an environment that includes a domain-agnostic resource allocation framework (RAF).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a domain-agnostic resource allocation framework. Section B sets forth representative applications of the resource allocation framework. Section C describes an explore mode and an exploit mode of operation of the resource allocation framework. Section D describes illustrative computing functionality that can be used to implement any aspect of the features described in the proceeding sections.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section D, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations

A. Overview of a Domain-Agnostic Resource Allocation Framework

FIG. 1 shows an illustrative environment 100 which includes a resource allocation framework (RAF) 102. By way of overview, the RAF 102 assigns items (conceptualized as balls herein) to item-receiving slots (conceptualized as bins herein). For example, in one problem domain, the balls correspond to virtual machines (VMs) and the bins correspond to servers. In another problem domain, the balls correspond to users and the bins correspond to servers. In another problem domain, the balls correspond to jobs and the bins correspond to time slots. In another problem domain, the balls represent paths in a network and the bins represent IDs, and so on.

The RAF 102 is said to be domain-agnostic. This means that the RAF 102 is not designed to serve any one problem domain; rather, the RAF 102 applies a set of core abstractions which are generic and can therefore be applied to various allocation problems. A user can apply the RAF 102 to a particular allocation problem by writing a specification 104. The specification 104 provides information, expressed in a declarative fashion, that describes the characteristics of the particular allocation problem.

In one implementation, the RAF 102 is implemented using a collection of processing elements 106. For example, the processing elements 106 may correspond to threads provided by one or more graphical processing units (GPUs), multi-core central processing units (CPUs), etc. Processing element 108 represents one member of the collection of processing elements 106.

In one implementation, each processing element 108 allocates balls to bins, to provide either a partial solution to the allocation problem or a complete solution. A complete solution corresponds to the case in which all balls are assigned to the bins, subject to the constraints specified in the specification 104. A partial solution corresponds to the case in which at least one ball remains unallocated, because it could not be placed in any of the bins, subject to the applicable constraints. Each processing element begins its processing by generating an ordering of balls, which, in one case, may be a random ordering. It then attempts to successively fit the balls into the bins, according to the order specified by the ordering. Each processing element produces a different ordering of balls, so different processing elements may produce different solutions.

The search conducted by the RAF 102 terminates when: (a) one of the processing elements 106 finds a complete solution to the allocation problem; or (b) the process is aborted, e.g., in response to an instruction from the user, or in response to the expiration of a defined search period, etc. Suppose that none of the processing elements finds a complete solution, and the process is not otherwise aborted. Each processing element will then generate another, potentially randomized, ordering of balls and repeat its search for a complete solution with respect to the new ordering.

In another implementation, the set of processing elements 106 includes a plurality of groups of processing elements, such as group 110 and group 112, etc. Each group cooperatively attempts to find a single complete solution to the allocation problem. Each group explores a different part of the search space by virtue of the fact it is operates on a different ordering of balls compared to other groups. The process terminates (or continues with another iteration) based on same conditions specified above for the first implementation.

A user can interact with the RAF 102 in different ways. In one approach, the RAF 102 may be implemented at a remote location with respect to the user. For instance, the RAF 102 may be implemented as a data service with a front-facing interface module 114. A user may interact with the interface module 114 using any user device 116 via network 118. The user device may correspond to a personal computer, a computer workstation, a portable computer of any type (e.g., a laptop computer, a mobile telephone, a tablet computer, etc.), and so on. The network 118 may correspond to a local area network, a wide area network (e.g., the Internet), a point-to-point conduit, and so on. In this scenario, the user uploads the specification 104 via the user device 116. In response, the user receives a solution from the RAF 102 which conveys either a partial or complete assignment of balls to bins (as mapped to real-world entities).

In another approach, the RAF 102 and the user are located at the same location. For example, the RAF 102 may be implemented by a user computer of any type that incorporates a GPU module, a multi-core CPU module, etc. In this scenario, the user may directly load the specification 104 into the local RAF 102. The RAF 102 then outputs a solution to the user in any manner, such as by displaying the solution, printing it, and/or storing it to a file, and so on.

Figure 2:
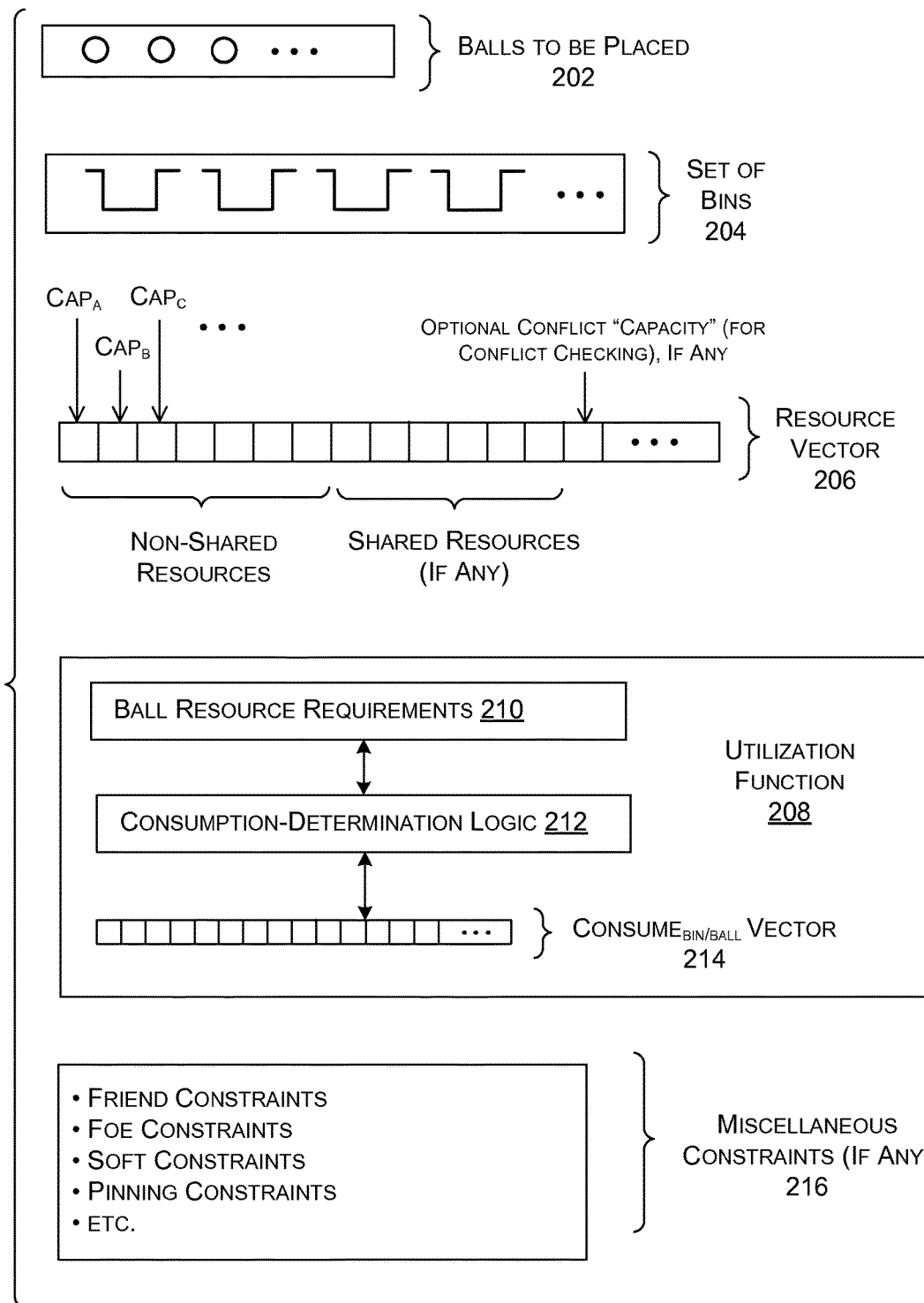
FIG. 2 shows different information items that may be imparted by a specification. The RAF uses the specification to instantiate its core abstractions for application to a particular problem domain.

Advancing to FIG. 2, this figure shows different information items that may be imparted by the specification 104, depending on the nature of the problem domain. As a first information item, the specification 104 maps a set of real-word entities (such as VMs) to the balls 202. As a second information item, the specification 104 maps a set of real-world objects (such as servers) to bins 204. Outside of this mapping, the abstractions employed by the RAF 102 treat balls and bins in a domain-agnostic manner.

A user can choose the number of bins in different ways. In one approach, for each bin-specific resource (such as CPU resource), the user can calculate the total requested usage of this resource by all the balls. The user can then divide this resource consumption by the total resource capacity for all of the bins, for the particular resource under consideration (such as CPU capacity). This yields a set of values for the different respective bin-specific resources. The maximum value corresponds to a lower-bound on the number of bins required. The user can choose a number of bins which is slightly larger than this lower bound. If an initial selection of bins does not yield adequate solutions, the user can increase the number of bins.

As a third information item, the specification 104 also specifies a resource vector 206. The resource vector 206 includes a number of dimensions corresponding to different resources associated with the allocation problem. For example, consider a set of n servers, each offering m non-shared resources (such as CPU resources, memory resources, disk resources, etc.). In this case, the resource vector may use n×m dimensions to describe these non-shared resources. The resource vector 206 can also specify the respective capacity of each non-shared resource dimension. For example, one dimension may provide the CPU capacity of a particular server.

The resource vector 206 allocates other dimensions corresponding to shared resources provided by a problem domain. For example, assume that a problem domain specifies the use of two servers connected together via two links. The resource vector 206 can include two additional dimensions corresponding to these links. Each shared dimension also specifies the capacity of a particular shared resource.

The resource vector 206 may also include zero, one, or more conflict dimensions. Each conflict dimension is assigned a conflict capacity. The RAF 102 uses a conflict dimension for different purposes, depending on the nature of the problem domain. In one case, for example, the RAF 102 can use a conflict dimension to identify an incompatible assignment of a ball to a bin. Section B provides examples which clarify the use of the conflict dimensions.

The specification 104 is also associated with a utilization function 208 (e.g., by inlining the utilization function 208 into the specification's instructions or by making reference to a separately-provided utilization function 208 using a link of any type). The utilization function 208 corresponds to a typically short program that accepts a current ball selection ($ball_{current}$), a current bin selection ($bin_{current}$), and a current partial assignment of balls to bins ($alloc_{current}$). That is, $alloc_{current}$ describes the balls that have already been allocated to bins. The utilization function 208 then returns an indication of how much resources will be consumed if the $ball_{current}$ is assigned to $bin_{current}$.

More specifically, the utilization function 208 may include ball resource requirements 210, consumption-determination logic 212, and a consumption vector $consume_{bin/ball}$ 214. The ball resource requirements 210 specify the amount of resources that are being requested for the entities associated with the balls (e.g., the VMs). The consumption-determination logic 212 implements analysis logic which specifies the amount of resources that will be consumed if $ball_{current}$ is assigned to $bin_{current}$. The consumption vector $consume_{bin/ball}$ expresses the consumption of resources. That is, the consumption vector $consume_{bin/ball}$ includes the same dimensions as the resource vector 206. The utilization function 208 loads the resources that are consumed by the placement of $ball_{current}$ in $bin_{current}$ current in appropriate dimensions of $consume_{bin/ball}$, based, in part, on the information specified by the ball resource requirements 210.

The specification 104 may also include a collection of one or more other information items 216, depending on the nature of a particular allocation problem, and the way that problem is modeled in the specification. For example, the specification 104 may specify that at least two balls have a "friend" relationship. This constraint instructs the RAF 102 to assign these two balls to the same bin. The specification 104 may also specify that at least two balls have a "foe" relationship. This constraint instructs the RAF 102 to assign these two balls to different respective bins. A specification can ensure that all balls are placed in separate bins by creating appropriate pairs of foes.

More specifically, in one case, the specification 104 may specify one or more friend groups. For example, the specification may indicate that balls 1, 2, 3 are friends. The RAF 102 will attempt to satisfy this constraint by placing all three balls in the same bin. The specification 104 can also specify overlapping friend groups, such as by specifying a first friend group of balls 1, 2, and 3, and a second friend group of balls 2, 4, and 6. The RAF 102 will attempt to satisfy this constraint by placing all six balls in the same bin, since these groups are linked together by the common ball 2.

The specification can also specify one or more foe groups, such as by specifying that balls 1, 2, and 3 form a foe group. In one interpretation, the RAF 102 can attempt to honor this constraint by placing all three balls in separate bins. In another interpretation, the RAF 102 can attempt to honor this constraint by simply preventing all three balls from being assigned to the same bin. That is, the RAF 102 can satisfy this constraint by placing at least one ball specified in a foe group apart from the others.

The specification 104 may also specify one or more soft constraints. A soft constraint specifies a condition under which another (hard) constraint may be violated, yet still be deemed acceptable. For example, as described above, the specification 104 may specify that certain balls are friends of each other, or foes of each other. But a soft constraint may indicate that this restriction can be relaxed in certain cases, providing that the RAF 102 cannot honor all the constraints specified by the specification. In another case, the specification 104 may specify that a group of servers each has a CPU capacity of z. But a soft constraint may specify that this hard constraint can be exceeded in certain cases, again providing that the RAF 102 cannot meet all of the constraints specified in the specification.

The specification 104 can specify a soft constraint in any manner, such as by specifying probability values, percentages, and so on. For example, a soft constraint can identify a probability value p which governs the application of a hard constraint. The RAF 102 will respond to this soft constraint by choosing a random number each time it seeks to apply the hard constraint in question. If the random number falls within a tolerance range specified by p, it will ignore the hard constraint. Section B provides additional examples of the application of soft constraints.

The specification 104 can also specifies a pinning constraint. The pinning constraint specifies that at least one ball will be considered a-priori assigned to a particular bin at the start of an attempt to find a solution to an allocation problem. For example, in one scenario, the RAF 102 can assign balls to bins for a particular job that commences at time $t_{start}$. Assume that a second job request arrives while the first job is currently in progress. The RAF 102 can pin the balls associated with the first job before allocating balls to the second job. This operation prevents the allocation process performed with respect to the second job from disrupting the resources that have already been allocated to the second job. Section B provides further details regarding the application of pinning constraints.

The information items enumerated in FIG. 2 are set forth by way of example, not limitation. Other specifications, developed for other problem domains, may specify additional information items.

Figure 3:
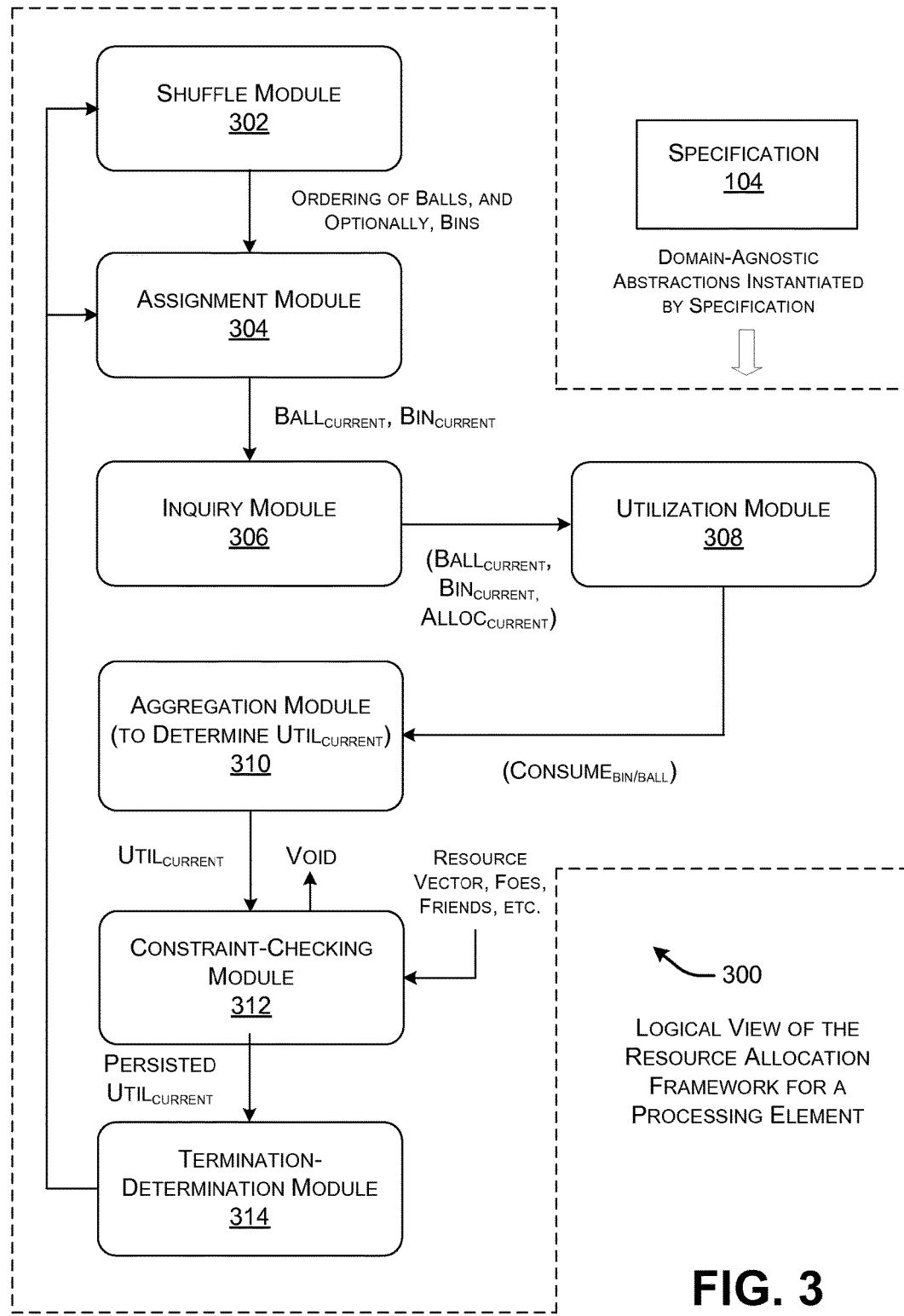
FIG. 3 shows a logical depiction of processing performed by the RAF of FIG. 1.

FIG. 3 sets forth a logical depiction 300 of the operation of the RAF 102. For example, each processing element of the RAF 102 may implement the various modules shown in FIG. 3. To facilitate description, FIG. 3 will be described for the case in which each processing element attempts to find its own solution to the allocation problem, without cooperating with other processing elements.

From a high-level standpoint, the core abstractions of the RAF 102 do not employ heuristics which take into account the nature of a particular problem domain. Rather, the RAF 102 "blindly" picks a ball and a bin. The utilization function then informs the RAF 102 of the amount of resources that will be consumed by that particular selection. The RAF 102 then determines whether that consumption of resources is acceptable, by leveraging the resource vector provided by the specification. The core abstractions of the RAF 102, however, make this determination by "blindly" comparing a current utilization vector ($util_{current}$) with the resource vector, without "knowing" what the dimensions of these vectors actually represent in the context of real-world resources.

More specifically, in one implementation, the RAF 102 assigns a single ball to a single bin. Balls and bins are atomic units that cannot be divided. As such, the user who writes the specification 104 is asked to define balls and bins to correspond to the smallest divisible parts of an allocation problem. Further, the core abstractions of the RAF 102 do not discriminate between different types of balls and bins. That is, a specification can itself discriminate between different types of balls and bins. But, in selecting a ball and bin, the core abstractions of the RAF 102 are agnostic as to how the specification will interpret this ball and bin. Section B sets forth examples which describe a representative specification which defines different types of balls and bins.

With the above introduction, the explanation will now describe each of the components shown in FIG. 3, in turn. The explanation will assume that representative processing element 108 (of FIG. 1) implements the components. Other processing elements implement the same set of components.

A shuffle module 302 selects an ordering of balls, such as, but not limited to, a random ordering of balls. For example, assume that there are 10 balls. Each processing element leverages its shuffle module 302 to produce a different ordering of these 10 balls (unless, by luck, two or more processing elements produce the same ordering). The shuffle module 302 can optionally also shuffle the ordering of bins in some manner, such as a random manner.

An assignment module 304 picks a candidate bin in some instances, and a candidate ball in other instances. For example, the assignment module 304 can begin its processing by selecting the first bin in the defined ordering of bins. Then the assignment module 304 can select the first ball from the defined ordering of balls. When the processing element 108 successfully places the first ball in the first bin (if possible), the assignment module 304 will then select the second ball in the ordering of balls, and attempt to fit that ball into the first bin. When the processing element 108 has attempted to successively fit all of the balls into the first bin, the assignment module 304 will then select the second bin. The processing element 108 will then attempt to successively fit all of the remaining unallocated balls into the second bin, and so on.

An inquiry module 306 calls a utilization module 308 with a current selected ball ($ball_{current}$), a current selected bin ($bin_{current}$), and a current partial allocation of balls to bins (that have already been placed by the processing element 108). The utilization module 308 represents an instantiation of the utilization function 208 described in FIG. 2. The utilization module 308 responds to the inquiry by generating the consumption vector $consume_{bin/ball}$, which describes the amount of resources that will be consumed providing that the chosen $ball_{current}$ is placed in the chosen $bin_{current}$.

An aggregation module 310 receives the consumption vector $consume_{bin/ball}$ from the utilization module 308. It then adds the resources consumption values specified in the $consume_{bin/ball}$ vector to appropriate dimensions of a current utilization vector $util_{current}$. The $util_{current}$ vector describes the current amounts of resources consumed by the current partial placement of balls to bins. For example, assume that the processing element 108 has placed four balls into one or more bins. The $util_{current}$ vector describes the resources that these four balls will consume if placed in the designated bins. The $util_{current}$ vector has resource dimensions which map to the resource dimensions of the resource vector 206.

A constraint-checking module 312 determines whether the current utilization of resources, as reflected by the $util_{current}$ vector, satisfies applicable constraints. In part, the constraint-checking module 312 performs this task by determining whether the resource utilization values in the $util_{current}$ vector do not exceed the corresponding capacity values specified in the resource vector 206. The constraint-checking module 312 can also determine whether the assignment of $ball_{current}$ to $bin_{current}$ does not violate any other constraint specified in the specification, such as a friend constraint or a foe constraint. If the various constraints are not violated, then the constraint-checking module 312 persists the aggregation performed by the aggregation module 310 with respect to the assignment of $ball_{current}$ to $bin_{current}$; otherwise, the constraint-checking module 312 will void the aggregation performed by the aggregation module 310.

A termination-determination module 314 determines whether it is appropriate to end the processing performed by the processing element 108. For example, the termination-determination module 314 may instruct the processing element 108 to cease it operations if the processing element 108 has found a complete solution to the allocation problem (in which all the balls have successfully been assigned to bins). In another case, the termination-determination module 314 can terminate an attempt to find a solution upon reaching a maximum time allotted for performing the search, or upon an express instruction from the user.

Figure 4:
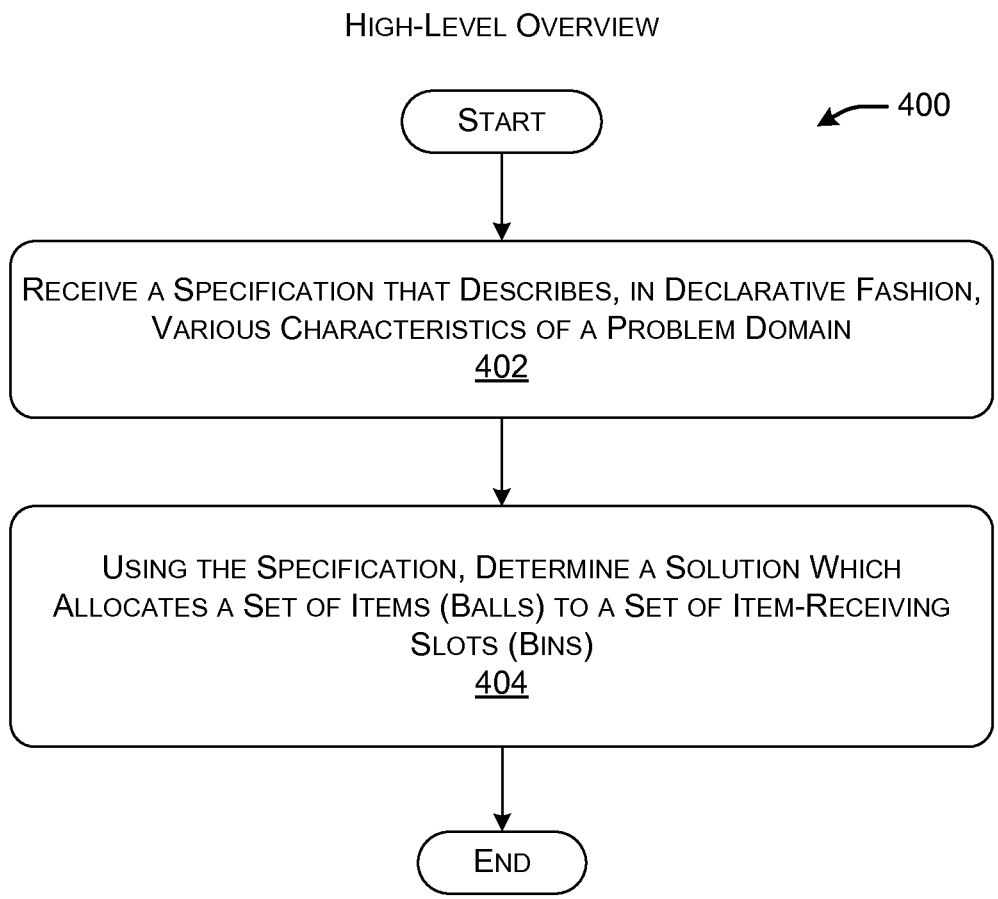
FIG. 4 is a flowchart that describes, in high-level form, one manner of operation of the RAF of FIG. 1.

FIG. 4 shows a procedure 400 that provides an overview of one manner of operation of the RAF 102 of FIG. 1. In block 402, the RAF 102 receives a specification from a user. The specification describes, in declarative fashion, various characteristics of a problem domain. In block 404, the RAF 102 uses the specification to determine a solution which allocates a set of items (conceptualized as balls) to a set of item-receiving slots (conceptualized as bins). In other words, the specification instantiates the domain-agnostic abstractions of the RAF 102 with respect to a particular allocation problem.

Figure 5:
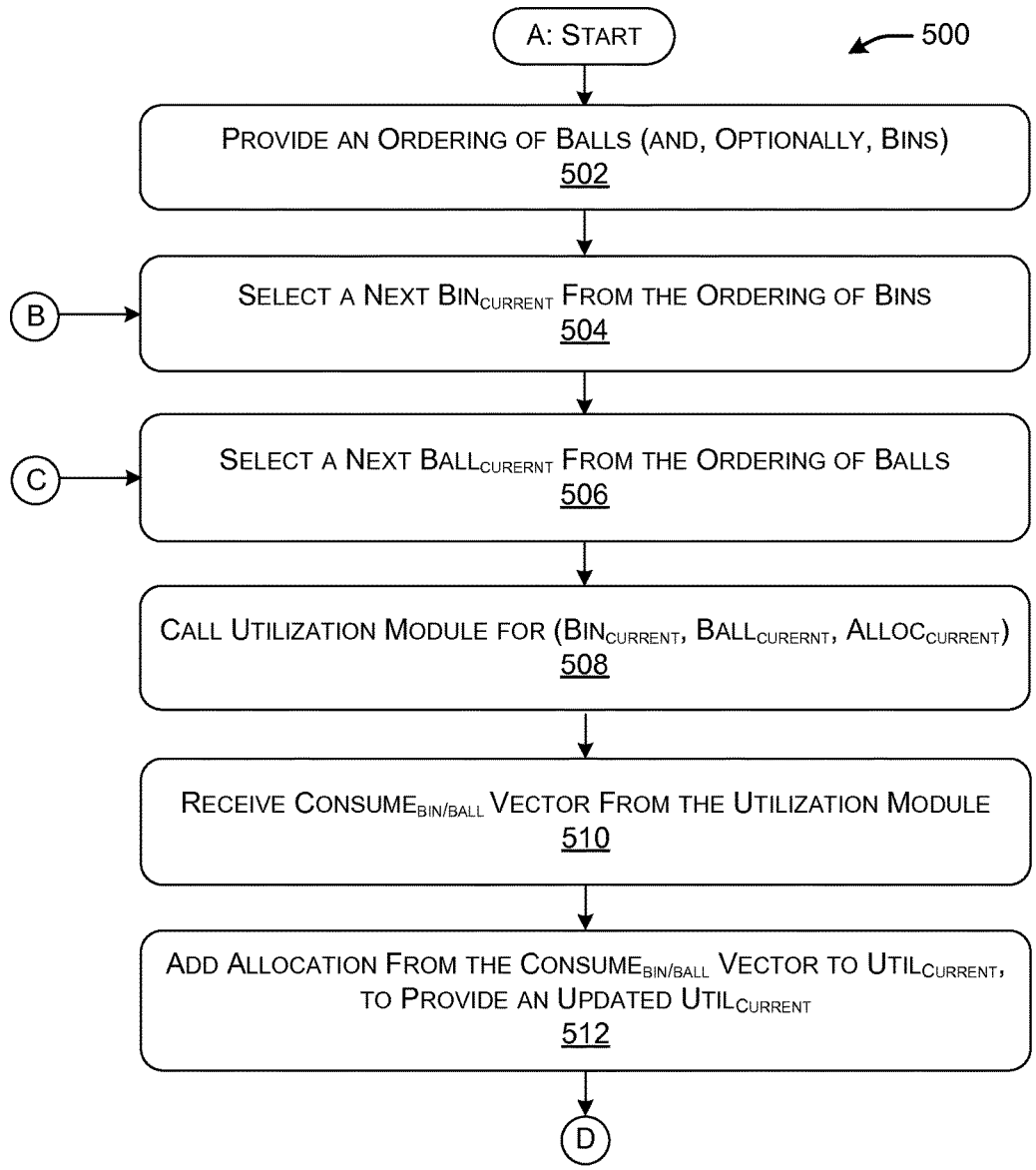
FIGS. 5-6 together provide a flowchart that describes one manner of operation of the RAF of FIG. 1; here, each processing element in the RAF works in independent fashion to find a solution to an allocation problem.
Figure 6:
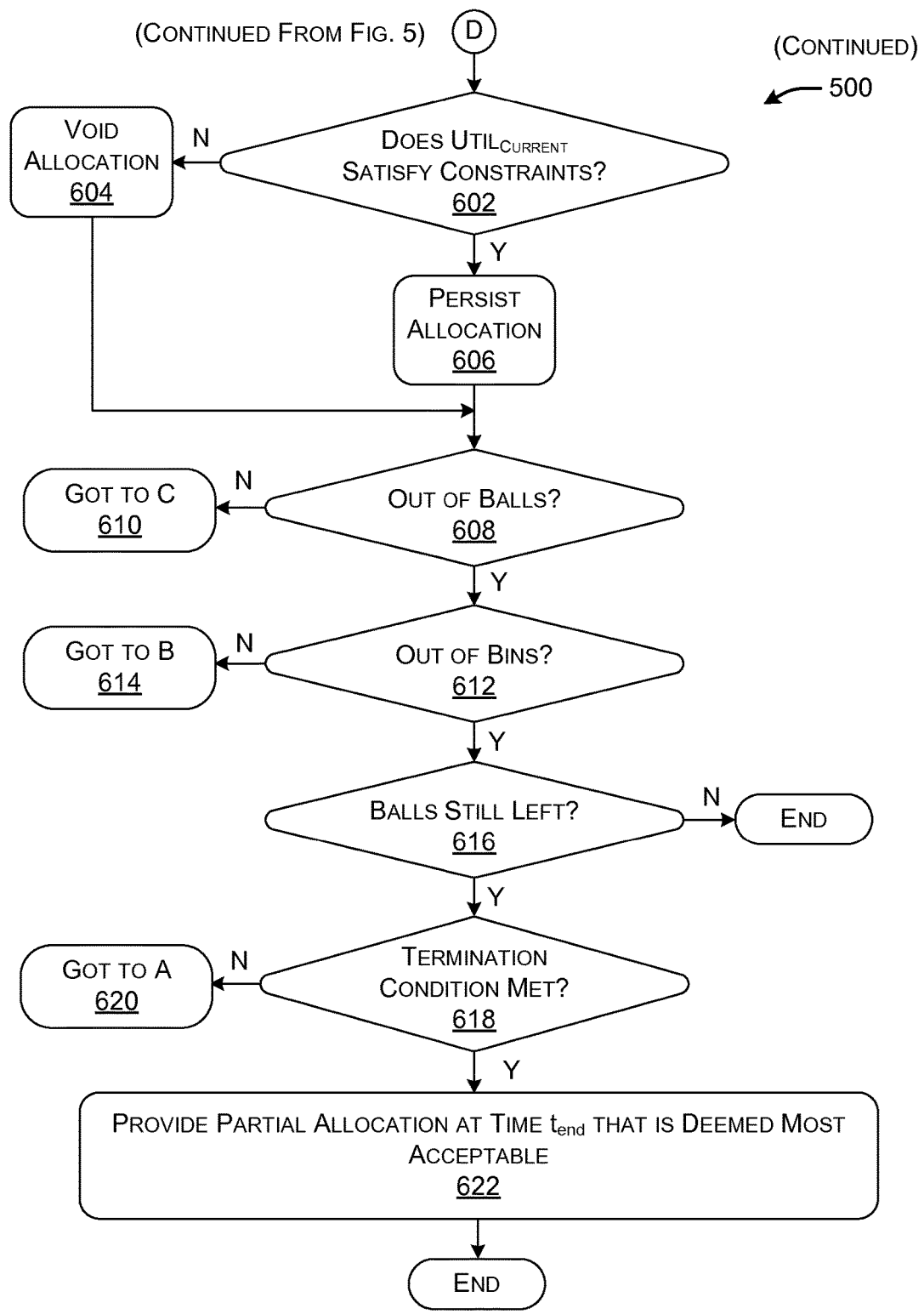

FIGS. 5-6 together show a procedure 500 that describes one manner by which a processing element—say, processing element 108—can attempt to find a solution to an allocation problem. In this mode of operation, the processing element 108 operates in a manner that is independent of other processing elements.

In block 502, the processing element 108 provides an ordering of balls (such as, but not limited to, a random ordering), and, optionally, bins. In block 504, the processing element 108 selects the next bin ($bin_{current}$) in the ordering established in block 502. At the start of the procedure 500, the $bin_{current}$ will correspond to the first bin in the ordering. In block 506, the processing element 108 selects the next ball ($ball_{current}$) in the ordering established in block 502. In the first iteration, the $ball_{current}$ will correspond to the first ball in the ordering.

In block 508, the processing element 108 calls the utilization module 308 for the selected $ball_{current}$ and $bin_{current}$, together with current allocation of bins to balls ($alloc_{current}$) (representing balls that have already been assigned to bins, based on a previous iteration of the procedure 500). In block 510, the processing element 108 receives a consumption vector ($consume_{bin/ball}$) from the utilization module 308. In block 512, the processing element 108 adds, in dimension-wise fashion, the values specified in the $consume_{bin/ball}$ vector to the current utilization vector, $util_{current}$.

Advancing to FIG. 6, in block 602, the processing element 108 determines whether $util_{current}$ satisfies all applicable constraints. If not, in block 604, the processing element 108 voids the aggregation performed in block 512. But if all of the constraints are satisfied, then, in block 606, the processing element 108 persists the allocation performed in block 512. The constraints include the capacity constraints specified in the resource vector, the conflict constraints (if any), the foe constraints (if any), etc.

Consider the particular case in which the processing element 108 has successfully placed a ball that is a member of a friend group. The processing element 108 can then successively repeat blocks 506-606 for each of the other members of the friend group (and any linked friend groups, if any). Assuming that block 602 is satisfied for all members of the friend group(s), the processing element 108 will persist the allocation of these balls and their associated resource consumptions. Otherwise, the processing element 108 will void all allocations associated with the friend group(s), even if some of the members can be individually placed without exceeding constraints.

In block 608, the processing element 108 determines whether it has attempted to place all of the unallocated balls in the ordering of balls into $bin_{current}$. If not, in block 610, the processing element 108 returns to block 508, in which the next ball in the ordering is selected. If, however, the processing element 108 has tried all of the balls, then it advances to block 612, in which it determines whether it has attempted to place all of the balls in all of the bins. If not, then, in block 614, the processing element 108 returns to block 504, in which it chooses the next bin in the ordering of bins.

Assume that the processing element 108 has tried to fit all balls into all bins. Then, in block 616, the processing element 108 determines whether there are any unallocated balls remaining. If not, then a complete solution has been found, and the processing element 108 terminates its search for a solution. But if a complete solution has not been found, the processing element 108 advances to block 618. There, the processing element 108 determines whether a termination condition has been met. One termination condition may correspond to the end of a search time interval. Another termination condition may correspond to an express instruction from the user to terminate the search for solutions. Assume that no termination condition has been met. Then, in block 620, the processing element 108 returns to block 502, in which the processing element 108 reshuffles the balls (and optionally, also reshuffles the bins). The processing element 108 then repeats the above-described procedure 500 with respect to the new ordering of balls (and, optionally, bins).

If a termination condition has been met, however, the processing element 108 advances to block 622. There, the processing element 108 offers whatever partial solutions that it has generated as per the last iteration of its processing. That is, recall that each of the processing elements 106 will be executing the same procedure 500 described above. Thus, each of the other processing elements 106 will provide their own partial solution to the allocation problem at the time of termination (presuming that a complete solution cannot be found.)

The RAF 102 can use various strategies to select the most appropriate partial solution among the set of partial solutions provided by the processing elements 106. In one approach, the RAF 102 can select the solution which places the most balls into bins. In another approach, the RAF 102 can select the solution which leaves the most amount of unconsumed resource capacity. In another case, the RAF 102 can select the solution that meets particular hard-to-satisfy constraints, and so on. Or the RAF 102 can pick a solution based on two or more the factors set forth above. In one implementation, one of the processing elements can be delegated the task of choosing the most desirable partial solution. In another implementation, a program implemented by a CPU can pick the most desirable partial solution.

Figure 7:
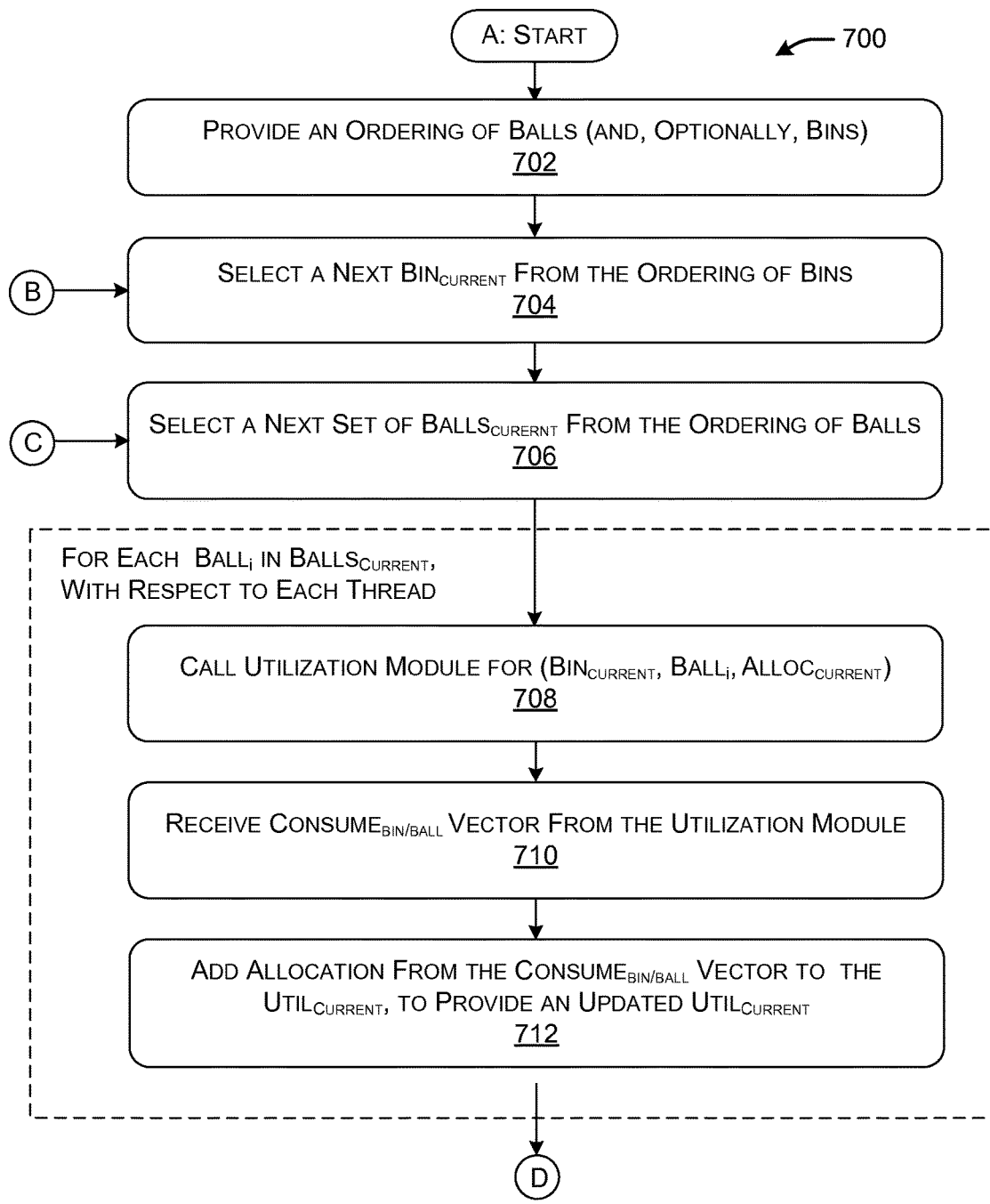
FIGS. 7-8 together provide a flowchart that describes another manner of operation of the resource allocation framework of FIG. 1; here, groups of processing element cooperatively work together to find a solution to an allocation problem.
Figure 8:
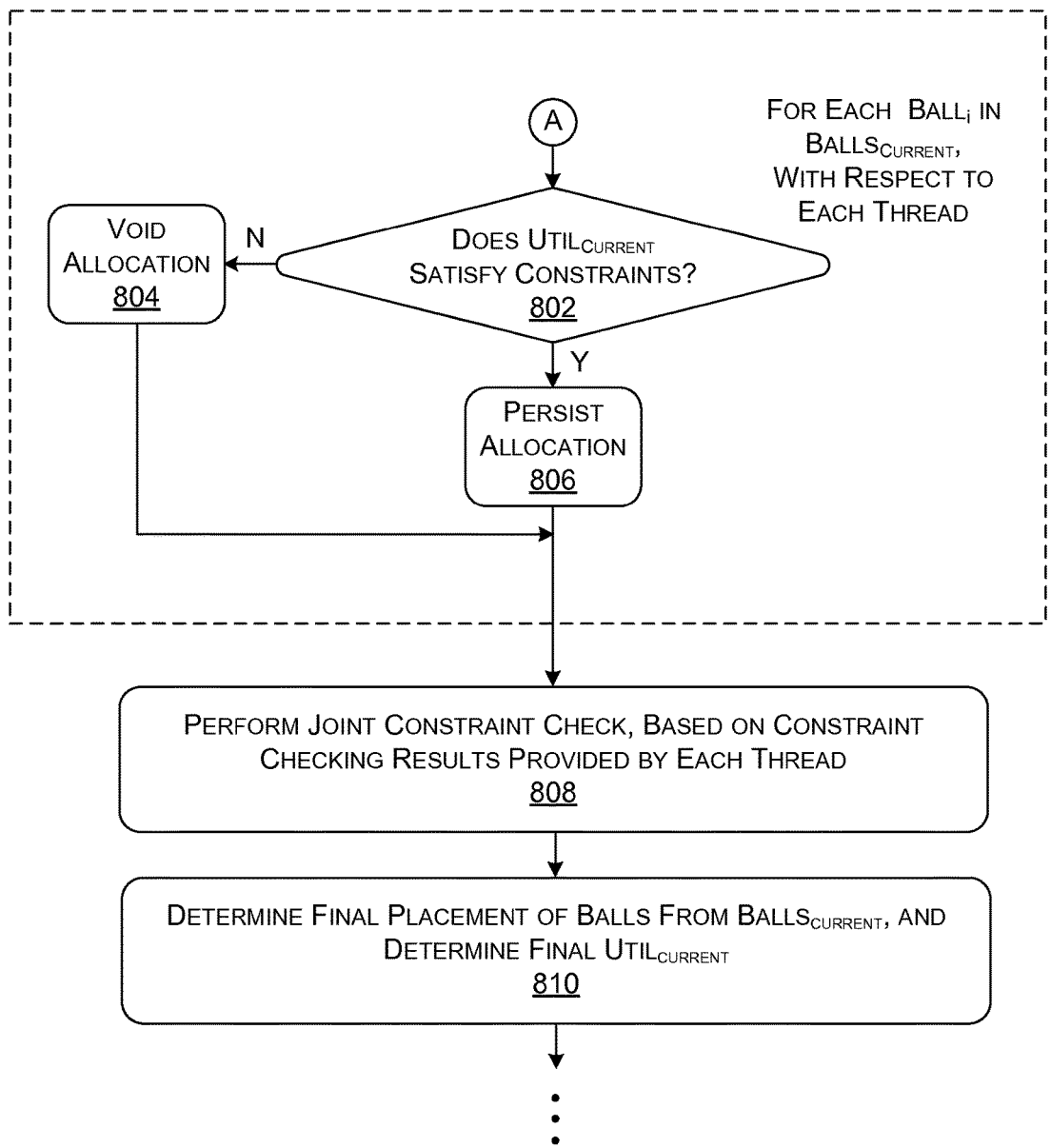

FIGS. 7-8 together shows a procedure 700 that describes one manner by which a group of processing elements (say, the group 110 in FIG. 1) attempts to find a solution to an allocation problem. In this mode of operation, the processing elements in the group 110 work in cooperation to find a single solution. Each group attempts to find a separate solution with respect to other groups.

In block 702, the group 110 provides an ordering of balls, and, optionally, bins. In block 702, the group 110 selects a next bin ($bin_{current}$) in the ordering of bins established in block 702. In block 706, the group 110 selects a next set of balls (balls$_{current}$) for processing by the group. For example, assume that there are 20 balls in the random ordering and there are five processing elements in the group. The group 110 can select the five next balls in the ordering of 20 balls for processing by respective members of the group 110. In one implementation, one of the processing elements in the group 110 can perform operations 702 and 704 on behalf of the other processing elements in the group 110.

Each processing element in the group 110 next performs the operations enclosed in the dashed box in FIGS. 7 and 8 with respect to a particular ball ball$_i$ from balls$_{current}$. In other words, each processing element in the group attempts to fit a different ball selected from balls$_{current}$ into bin$_{current}$. The processing elements in the group perform these computations in a parallel manner.

More specifically, in block 708, each processing element in the group—say processing element 108—calls the utilization function with respect to bin$_{current}$ and alloc$_{current}$. In block 710, the processing element 108 receives the utilization vector consume$_{bin/ball}$. In block 712, the processing element 108 adds the values specified in consume$_{bin/ball}$ to util$_{current}$ in a dimension-wise fashion. In block 802, the processing element 108 determines whether util$_{current}$ satisfies all applicable constraints. If not, then in block 804, the processing element 108 voids the aggregation performed in block 712. But if the constraints are fully met, then, in block 806, the processing element persists the aggregation performed in block 712.

In block 808, the group 110 performs a joint check to determine if all of the ball placements made in blocks 708-806 are mutually compatible. That is, each processing element performs blocks 708-806 without reference to the allocations performed by other processing elements. Block 808 determines whether all of the allocations performed by the processing elements satisfy all of the applicable constraints, when considered together.

In block 810, the group 110 determines a final placement of balls from balls$_{current}$ into bin$_{current}$ based on the results of the constraint checking performed in block 808. For example, if the group 110 determines that all of the constraints are satisfied for all of the individual allocations, then the group 110 can persist the individual allocations performed by the separate processing elements. The group 110 also updates util$_{current}$ in an appropriate manner. If the constraints are not all satisfied, then the group can void one or more allocations performed by the individual processing elements, and adjust the util$_{current}$ vector accordingly. In one implementation, one of the processing elements in the group 110 can perform the above-described operations of blocks 808 and 809.

B. Illustrative Examples

The RAF 102 can be applied to many allocation problems in which items (conceptualized as balls) are assigned to item-receiving slots (conceptualized as bins). To perform this task, a user writes a specification which describes the characteristics of the problem domain, leveraging the constructs set forth in Section A. This section describes several problem domains, and the specifications used to describe these domains.

a) Assigning VMs to Servers, without Consideration of Bandwidth Requirements.

FIG. 9 shows a specification that describes a first allocation problem. In this case, a requestor wants to run an application using four VMs on a cloud infrastructure. Table 1 sets forth the CPU and memory requirements of each VM. Assume that the cloud data center provides two servers to run these VMs: server S0 and server S1. Table 2 identifies the CPU and memory capacities of these two servers. Further assume that the following constraints apply to the allocation problem: (1) The CPU and memory requirements of the VMs, when placed on a server, cannot exceed the capacity of that server; and (2) VM2 and VM3 are replicas that the requestor wishes to place on different servers to ensure fault-tolerance.

Specification 1 captures the above-described allocation problem. Line 1 of the specification maps balls to the four VMs (e.g., ball 0=VM0, ball 1=VM1, etc.). Line 2 of the specification maps bins to servers (e.g., bin 0=server S0 and bin 1=server S1). Lines 3 and 4 define a resource vector having four dimensions. The first two dimensions identify the CPU and memory capacities of the server S0, while the next two dimensions identify the CPU and memory capacities of the server S1.

Lines 6-13 set forth the utilization function of the specification. Once instantiated, the utilization function implements the utilization module 308 introduced in the context of FIG. 3. To repeat, the utilization function accepts a current ball selection (ball$_{current}$), a current bin selection (bin$_{current}$), and a current allocation of bins and balls (alloc$_{current}$). The utilization function computes the resources that will be consumed if ball$_{current}$ is assigned to bin$_{current}$. Note that that the utilization function does not apply a heuristic. The RAF 102 merely "blindly" assigns a ball and bin, and the utilization function reports the consequence of assigning this ball to the bin.

More specifically, lines 6-9 encode the VM requirements of the VMs, obtained from Table 1, in a UtilData array. Line 10 initializes the consume$_{bin/ball}$ vector (denoted in FIG. 9 as simply "Util"). Lines 11 and 12 load the requirements of the selected VM (associated with the selected ball) into appropriate dimensions of consume$_{bin/ball}$. Line 13 returns the resultant consume$_{bin/ball}$ vector to the aggregation module 310 (of FIG. 3). (Note that Specification 1 does not use the alloc$_{current}$ information.)

Finally, line 14 of the specification encodes the second constraint set forth above. That is, line 14 states that VM2 and VM3 are foes. To honor this constraint, the RAF 102 will place VM2 and VM3 on separate servers.

b) Assigning VMs to Servers, with Consideration of Bandwidth Requirements.

FIG. 10 shows a specification that describes a second allocation problem. Like the first example, assume that the requestor wants to run an application in a data center using four VMs. And the administrator again designates the use of two servers to run the VMs (S0 and S1). The VM requirements are the same as specified in Table 1 of FIG. 9, and the server capacity information is the same as specified in Table 2 of FIG. 9.

In this case, further assume that the VM requirements now also specify a bandwidth requirement from each VM to every other VM. Further assume that the two servers are connected by a single switch. A first link (Link0) models the traffic from the first server S1 to the second server S1, and a second link (Link1) models the traffic from the second server S1 to the first server S0. In one case, these two links may correspond to two physical mono-directional links in the data center. In another case, these two links may refer to different flows associated with a single physical link, that is, a first flow directed to server S1 and a second flow directed to server S0. Assume that Link0 has a capacity of 150, and Link0 has a capacity of 100. Further, this allocation problem introduces the following new constraint: Communicating VMs are to be placed on servers so as to not exceed the capacities of network links connecting those servers.

Specification 2 captures the above-described allocation problem. First, note that the specification includes the same information imparted by Specification 1 shown in FIG. 9. However, to simplify the drawing, the excerpt of Specification 2 omits this information.

In line 1, the Specification 2 identifies two new dimensions of the resource vector (in addition to the first four dimensions listed in Specification 1). That is, the fourth dimension lists the capacity of Link0, while the second dimension lists the capacity of Link1.

Within the utilization function, lines 3-4 describe the bandwidth requirements of the set of four VMs. For example, line 3 indicates that VM0 asks for 10 units of bandwidth for traffic directed from VM0 to VM1. Line 4 indicates that VM1 asks for 20 units of bandwidth for traffic directed from VM1 to VM0, and so on. Lines 7 and 8 describe the paths between S0 and S1. That is, line 7 describes a first path between server S0 and server S1, while line 8 describes a second path between server S1 and server 0. Each path is annotated with references to dimensions in the resource vector that are associated with the path. The paths can be discovered in any manner, e.g., by consulting known configuration information, by consulting routing tables, by running trace routes, and so on.

Lines 9-15 describe the manner by which the utilization function determines the bandwidth requirement that is incurred upon the assignment of a $Ball_{current}$ (denoted in FIG. 10 as simply Ball) to a $Bin_{current}$ (denoted in FIG. 10 as simply Bin). OBall refers to another ball (besides Ball) that may or may have already been assigned to a bin (in a previous call to the utilization function). OBin refers to the bin which stores OBall, if OBall has in fact been already assigned to a bin.

More specifically, line 10 consults the $alloc_{current}$ information to determine whether a particular OBall has been assigned. It defines OBin as the bin which stores OBall, and, if OBall has not been assigned, it defines OBin as the NULL value. In line 11, the utilization function determines whether OBin exists (is not NULL), and whether the OBall is not stored in the same Bin as Ball. If so, in lines 12 and 13, the utilization function adds up all of the bandwidth requirements, for all links, on the path that leads from the server which hosts Ball to the server which hosts OBall. In lines 14 and 15, the utilization function adds up all of the bandwidth requirements, for all links, on the path that leads from the server which hosts OBall to the server which hosts Ball.

The utilization function repeats the above-described process for all OBalls. At the end of the process, the bandwidth-related dimensions of $consume_{bin/ball}$ will itemize, on a link-by-link basis, the bandwidth that will be consumed upon assigning the chosen Ball to the chosen Bin. In general, note that this utilization function adds the bandwidth consumption between two balls only when both those balls have been placed on servers.

FIG. 11 shows a third allocation problem. The allocation problem in this case has the same characteristics as those stated above with respect to FIG. 10. This case, however, uses a more complex strategy to model the physical network that includes server S0 and S1. That is, as shown in representative Graph A, the network can be conceptualized as a hierarchy of nodes. The leaf nodes (e.g., nodes 4, 5, 6, etc.) correspond to servers. Alternatively, in another interpretation, the leaf nodes correspond to racks, each of which stores one or more servers. The non-leaf nodes (e.g., nodes 1, 2, 3, etc.) correspond to switches of any type which couple the equipment associated with the leaf nodes together. A root node corresponds to the top-most switch in the network. A least common ancestor (LCA) node, associated with two or more leaf nodes, corresponds to an ancestor to those leaf nodes that is least common among a set of common ancestors to the leaf nodes. For example, in Graph A, the root node is also a common ancestor to leaf nodes 4 and 5, but the root node is also an ancestor to leaf node 6; therefore, the node 2 is a less common ancestor for leaf nodes 4 and 5, compared to the root node.

FIG. 11 lists a portion of Specification 3 which determines the allocation of bandwidth for the assignment of a particular Ball to a particular Bin. (Specification 3 omits the information imparted by Specification 1 to simplify depiction.) The terms OBall and OBin have the same meaning as set forth above with respect to Specification 2. Further, Specification 3 assumes that the data center uses shortest path routing. This means that the data center will route the traffic between any two VMs using the most efficient (e.g., shortest) path.

In lines 9-11, the utilization function determines whether OBin is not NULL and whether OBin is not Bin. In other words, this check determines whether OBall exists, and whether OBall and Ball are placed in different bins. If this test is met, the utilization function adds up all of the bandwidth requirements for all links in the path to the LCA node, PathToLCA[Bin][OBin]. For example, assume that leaf node 4 (shown in Graph A) is associated with a server that hosts Ball. Further assume that leaf node 5 is associated with a server that hosts OBall. The PathToLCA correspond to the path from node 4 to the least common ancestor associated with nodes 4 and 5, which corresponds to node 2. More specifically, line 11 takes into consideration the bandwidth requirements in the flow directed away from Ball (to OBall), as well as the bandwidth requirements in the flow directed towards Ball (from OBall).

In lines 12-14, the utilization function determines whether OBin is equal to NULL, which means that the OBall has not yet been assigned. If so, the utilization function stores all of the bandwidth requirements on the links from the server which hosts Ball (associated with Bin) to the root of the tree. In performing this operation, the utilization function is assuming the worst possible consumption of bandwidth between Ball and OBall (where OBall has not yet been placed), corresponding to the case in which OBall is placed "farthest" from OBall with respect to the available routing paths in Graph A.

Lines 15-17 perform appropriate bookkeeping when OBall is eventually placed in a particular OBin. For example, when placing Ball, assume that the utilization function originally assumed the worst possible placement of the unplaced OBall. As per lines 12-14 described above, the utilization function will address this situation by adding the bandwidth contributions on the links from Bin to the root of the tree. Later assume that OBall is placed on the same server as Ball (meaning that these balls are placed in the same bin). There will therefore be no bandwidth cost between OBall and Ball. Lines 15-17 therefore void the previously computed bandwidth contributions that were added in lines 12-14.

Although not shown in Specification 3, the utilization function performs a similar correction when OBall is placed on a different server than Ball, but the path from Ball to OBall does not require passing through the root node. That is, the path passes through a least common ancestor (LCA) which is not the root of the tree. The utilization function can remove the portion of the bandwidth contributions added in lines 12-14 which has proven to be unduly pessimistic, in view of the actual placement of OBall on a particular server.

c) Assigning VMs to Servers, with Plural Paths Connecting Servers.

Next consider the case in which a data center includes multiple paths between any two servers. This means that these two servers can communicate using any one of these paths. In this case, a utilization function can include the following modification: When a VM (say, $VM_x$) is to be placed on a server (Bin), then for every other VM (say, $VM_y$) that has already been placed on a different server (OBin), the utilization function adds the bandwidth requirements between $VM_x$ and $VM_y$, divided by the number of paths between the servers $VM_x$ and $VM_y$, on all the paths from $VM_x$ to $VM_y$.

For example, assume that $VM_x$ can communicate with $VM_y$ using any of a set of three paths that are directed from $VM_x$ to $VM_y$, and $VM_y$ can communicate with $VM_x$ using any of a set of three paths that are directed from $VM_y$ to $VM_x$. Assume that the utilization function wishes to tally the bandwidth requirements on physical links from $VM_x$ to $VM_y$. It first divides the bandwidth requirement from $VM_x$ to $VM_y$ by 3 (the total number of links providing flow from $VM_x$ to $VM_y$). It then assigns this result to all of the three links which direct flow from $VM_x$ to $VM_y$. The utilization function can perform the same operation in the opposite direction, from $VM_y$ to $VM_x$.

d) Assigning VMs to Servers in a Virtual Star Topology.

Next consider the case in which the data center organizes VMs in a virtual star abstraction. This abstraction provides a single virtual switch which connects all VMs. The underlying physical network, however, may have any topology, such as the tree topology shown in FIG. 11. Each virtual link in the virtual network has the bandwidth requirement B. The required capacity on a particular physical link in the physical network, in turn, is given by min(m, N−m)*B. N refers to the number of VMs in the virtual network, where m refers to the number of VMs in a sub-tree connected to the link under consideration. For example, in FIG. 10, assume that the physical link under consideration is link 1102. That link is connected to a sub-tree that hosts two VMs (associated with nodes 4 and 5), and therefore m is 2 in this case. The "min" operator involves selecting whatever value is smallest, m or N−m.

A specification for this case provides a resource vector having, in addition to the non-shared dimensions, a dimension associated with each link in the physical network. The specification also identifies the N VMs in the data center and the required bandwidth value B. The specification also expresses the path between every pair of servers.

Assume that, at a particular time, k VMs have already been placed on a particular server. When a particular new VM, say $VM_z$, is to be placed on this server, the number of VMs potentially placed outside this server is N−k−1. Using the bandwidth calculation formula specified above, the specification can compute the bandwidth usage on a link associated with this server as follows. If (k+1)<(N−k−1), the bandwidth usage on the link is (k+1)*B. Otherwise, the bandwidth usage on the link is N−(k+1)*B.

e) Assigning VMs to Servers Based, with Consideration of Time-Varying Resource Utilization.

The examples considered thus far involve the static placement of VMs to servers. Many real-world scenarios also take into account the times at which VMs run their applications in a data center. For example, user-facing VMs (that handle the requests of users) may perform more work in the day compared to the night, and therefore consume more resources during the day. In contrast, batch-processing VMs (which perform background computations) may perform more work at night, and therefore consume more resources at night. The availability of spare resources on any server therefore varies as a function of time.

To address this kind of allocation problem, a RAF specification can expand the types of resource dimensions defined above to take into account utilization per time slot. Consider a server S0 having a CPU capacity $S0_{CPU}$. The resource vector can include a resource dimension for $S0_{CPU}$ for each time slot, e.g., $S0_{CPU\_T0}$, $S0_{CPU\_T1}$, $S0_{CPU\_T2}$, etc. The capacity of each such dimension is the same as the original capacity of $S0_{CPU}$, assuming that the CPU capacity remains constant over time.

Further, the utilization function replaces the static listing of resource requirements with a time-varying listing of resource requirements. For example, for VM0, the CPU requirement may specify the requirement set [20, 30, 100, . . . ]. Each element in this set specifies VM0's CPU requirement for a particular time slot.

To compute the amount of resources consumed when a particular VM is assigned to a particular server, the utilization function will add up the consumption on a time-slot-by-time-slot basis. Say, for example, that a particular VM makes heavy use of a server during the day, whereas another VM makes heavy use of a server at night. If placed on the same server, the consumption for these two servers will be added to different dimensions of $consume_{bin/ball}$. Hence, the RAF 102 may determine that this joint placement is permissible because it does not exceed the capacity of any one dimension, whereas it would not be permissible if both the VMs were running at the same time.

In some cases, a RAF specification may also specify one or more soft constraints. Consider the illustrative rule in which a server is temporally permitted to exceed its capacity for 5% of the time slots, by at most 10%. The specification can express this soft constraint using the statement: OVERFLOW: [{$S0_{CPU\_T0}$, $S0_{CPU\_T1}$, . . . }$_{p=0.95, b=10\%}$; . . . ]. The RAF 102 will interpret this constraint in the following manner. Assume that the RAF 102 attempts to add a ball to server S0, but finds that doing so will exceed the capacity (ies) of one or more dimensions of the resource vector. The RAF 102 will then check to determine whether this deviation is permitted by the OVERFLOW information in the specification. For example, assume that the ball placement violates the CPU capacity of server S0 for at least one time slot. The RAF 102 will determine whether: (a) the capacity is exceeded by no more than b percent; and (b) at least p % of the dimensions in the group {S0CPUT0, S0C-PUT1, . . . } do not exceed their capacity. If this test is met, the RAF 102 will allow the assignment.

f) Assigning VMs to Servers with Respect to Particular Jobs.

In the next example, requestors make requests for server resources as a function of time. These requests constitute jobs having respective durations. The RAF 102 handles these requests by assigning the jobs to particular servers with respect to particular time slots. To execute a job, the data center waits until the start of the job, and then runs the job on the designated servers for the duration of the job. In this case, therefore, the RAF 102 performs the dual task of scheduling jobs and assigning VMs to servers; these tasks are interconnected.

Figure 12:
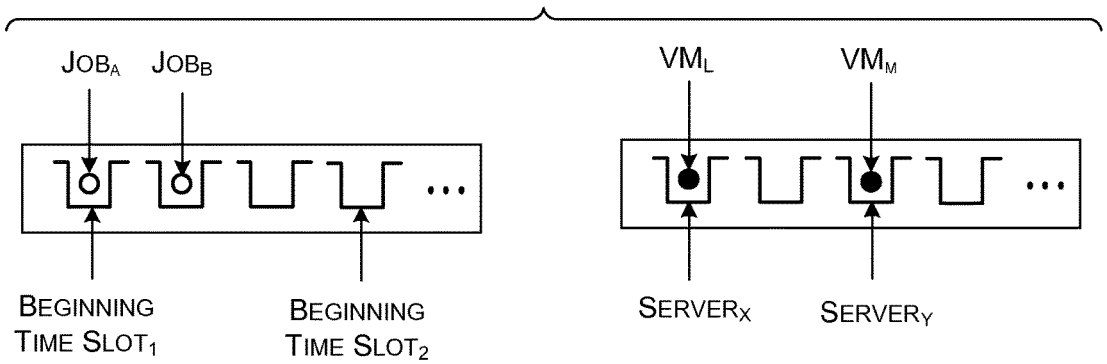
FIG. 12 depicts a manner by which a specification can model the characteristics of a job scheduling problem.

In one approach, a user can capture the above-described allocation problem using a specification that defines two types of balls and two types of bins. More specifically, as shown in FIG. 12, a representative RAF specification defines job bins for receiving job balls and server bins for receiving server balls. Each job bin is associated with a start time. Once the RAF 102 assigns a job to a job bin, the job runs for the number of contiguous time-slots specified in the job request, starting at the time slot associated with the job bin. Further, each job is associated with one or more VMs which perform work for that job.

In addition, the RAF specification defines a resource dimension for each time-slot for each non-shared server resource (CPU, memory, etc.). Similarly, the RAF specification can define a resource dimension for each time-slot for each shared resource (such as bandwidth for each network link). In addition, the RAF specification defines a resource dimension for total resource capacity, for each time slot and for each resource, with a capacity set to the aggregate resource capacity across all servers. For example, the resource dimension for total CPU capacity for each time slot corresponds to the total available CPU capacity on all servers in that time slot.

In operation, the RAF 102 places job balls in only job bins, and places server balls in only server bins. However, the RAF specification is the only knowledge which distinguishes between different types of balls and bins; that is, the core abstractions provided by the RAF 102 pick balls and bins without regard to their definitions provided in the specification. Therefore, to enforce the above-described placement constraints, the specification adds a conflict dimension C to the resource vector. That dimension has an arbitrarily-chosen capacity of, say, 1. The utilization function will assign a value of 2 to the capacity dimension of $consume_{bin/ball}$ if a job ball is assigned to a server bin, or a server ball is assigned to a job ball. The RAF 102 will reject this assignment by virtue of the fact that the conflict dimension of $consume_{bin/ball}$ exceeds the capacity of the conflict dimension of the resource vector (which is set to 1). Each processing element attempts to assign every ball to every bin. This will ensure that a processing element will try to fit every unallocated job ball into every job bin, and every unallocated server ball into every server bin.

More specifically, assume that the utilization function is asked to consider the appropriateness of fitting a job ball into a job bin, where that job bin is associated with a starting time $T_x$. (Further assume the simplified case in which bandwidth requirements do not play a role in this allocation problem.) The utilization function computes the aggregate CPU and memory requirements for the job, and then adds those values to the dimensions corresponding to the total CPU consumption and total memory consumption for time-slot $T_x$, and k subsequent timeslots, where k is the duration of the job. Thus, if job $J_i$ lasts 2 time-slots, the utilization function increments resource dimensions TOTAL_CPU_$T_x$, TOTAL_CPU_$T_{x+1}$, TOTAL_MEM_$T_x$, and TOTAL_MEM_$T_{x+1}$ of the $consume_{ball/bin}$ vector. The RAF 102 then compares these values with associated dimensions of the resource vector to identify assignments of jobs to time slots that are impossible to satisfy. If the constraints are not violated, the RAF 102 assigns the job to the specified job bin.

Now assume that the utilization function is asked to consider the appropriateness of adding a particular server ball to a particular server bin. The utilization function first checks to determine whether the job that this server ball is associated with has already been assigned to a job bin. If not, the utilization function aborts the assignment by setting the conflict dimension of $consume_{bin/ball}$ to 2. Alternatively, assume that the job associated with the server ball has been assigned, and that jobs starts at time $T_x$. The utilization function then increments the resource dimensions of $consume_{bin/ball}$ corresponding to the server (say, $S_m$) associated with the server bin, for each of the time slots associated with the duration of the job. For example, the utilization function will increment dimensions $S_m$CPU_$T_x$, $S_m$CPU_$T_{x+1}$, $S_m$MEM_$T_x$, and $S_m$MEM_$T_{x+1}$.

The RAF 102 can also process requests that arrive in staggered fashion over time, after having already assigned one or more previous jobs to time slots and servers. RAF 102 performs this task by pinning all the job balls that are currently executing at the time of the new request to their corresponding job bins (e.g., their corresponding start times). Similarly, the RAF 102 pins the server balls associated with the executing jobs to their corresponding server bins. The RAF 102 can perform this task by applying appropriate pinning instructions provided in the specification. Those instructions specify that jobs that are executing at the time of a new request are to be honored, without disrupting these jobs. In an alternative implementation, the RAF 102 can also pin at least some job balls and server balls that have already been allocated to respective bins, but in which the jobs have not yet commenced (meaning that the jobs have been successfully scheduled to run at specified times in the future, but are not currently executing).

In practice, when processing a new request, the RAF 102 first processes all pinned balls by calling the utilization function for each of the pinned balls. By doing so, the RAF 102 reconstructs the $consume_{bin/ball}$ vector with respect to the currently executing and/or scheduled future jobs. After that is done, the RAF 102 proceeds to assign a new job to appropriate bins based on available resources.

Figure 13:
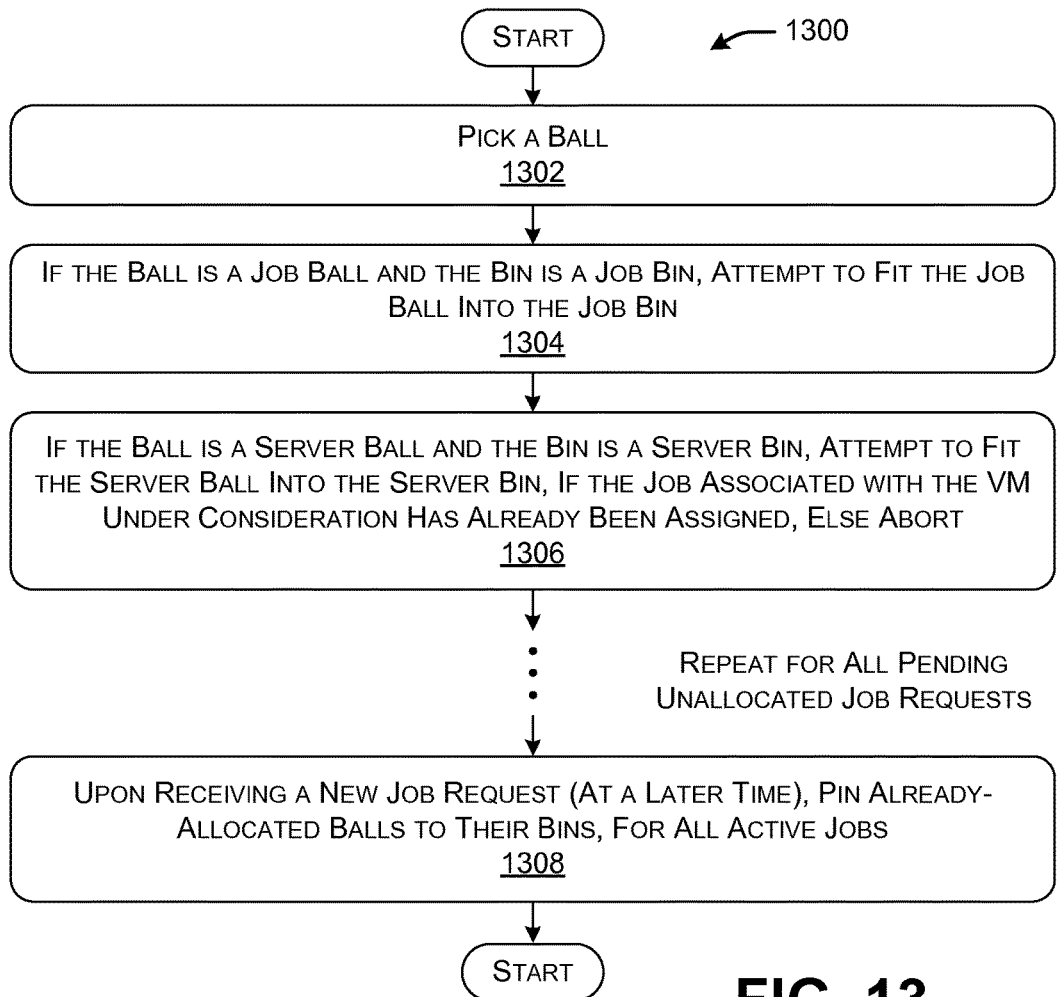
FIG. 13 is a flowchart that describes one approach by which the RAF may perform a job scheduling operation, using the concepts set forth with respect to FIG. 12.

FIG. 13 shows a procedure 1300 which summarizes the above-described operations. In block 1302, the RAF 102 picks a ball. In block 1304, if the chosen ball is a job ball and the chosen bin is a job bin, the RAF 102 attempts to fit the job ball into the chosen job bin. In block 1306, if the chosen ball is a server ball and the chosen bin a server bin, the RAF 102 attempts to fit the server ball into the server bin, providing that the server ball's associated job ball has already been assigned to a job bin. (Note that the specification establishes a nexus between the chosen server ball, corresponding to a VM, and a particular job). The RAF 102 repeats this process with respect to all pending job requests. In block 1308, upon receiving a new job request, the RAF 102 pins the currently executing and/or scheduled future jobs to their associated job bins and server bins. The RAF 102 will thereafter attempt to satisfy the new job request using the remaining unallocated job balls and unallocated server balls.

g) Assigning VMs for the Case of Rack-Aware Replica Placement.

In the next allocation problem, a requestor may wish to place three data replicas: two on separate servers on the same rack, and one on a server on a different rack. A RAF specification can capture this problem by defining two ball types (a rack ball and a server ball) and two bin types (a rack bin and a server bin). The RAF specification represents each replica with two balls: a rack ball to be placed on a rack bin, and a server ball to be replaced on a server bin. Hence, the specification associates six balls per data item.

The RAF 102 enforces the placement constraints defined above using friend and foe constraints. That is, the specification describes rack balls 1 and 2 as friends, and rack balls 1 and 3 as foes. This captures the replica-to-rack constraints. Further, the specification states that server balls 1 and 2 are foes. This has the effect of placing the same-rack replicas on different servers.

In operation, the RAF 102 assigns a rack ball prior to assigning any server ball associated with the rack in question. This parallels example (f) set forth above, in which the RAF 102 assigns a job ball prior to assigning any server ball associated with the job ball.

h) Assigning Network Paths to VLAN IDs.

In the next example, the allocation problem involves mapping network paths to a minimal number of VLAN IDs as part of a multipath protocol. This problem further stipulates that the network paths assigned to a VLAN ID cannot create a loop. The RAF 102 models this problem by using balls to represent paths, and bins to represent VLAN IDs. Further, the utilization function includes logic for determining whether adding a path to a VLAN ID creates a loop with the already existing paths in the VLAN.

The RAF 102 cannot directly minimize the number of VLANs. However, the RAF 102 can indirectly approximate this result by starting with a suitable lower-bound number of bins, and then iteratively increasing the number of bins until a solution is found, if possible.

i) Mapping Ports to a Switch.

In the last example, the allocation problem involves mapping flows to different ports of a switch. That is, in this problem, the objective is to map flows so that they minimize the difference between the flow capacities of the highest-loaded ports and the lowest-loaded ports. The specification approximates this objective by constraining the difference between the loads of any two ports to a given value. The RAF 102 iteratively tightens this constraint when searching for solutions, until the RAF 102 fails to yield a solution.

In conclusion, this section has set forth several examples by way of example, not limitation. The RAF 102 can be applied to many other problem environments, such as: allocation problems that impose path length constraints; multicast wireless networks problems; server selection problems in wide-area content distribution networks; VLAN assignments in enterprise networks, and so on.

C. Explore and Exploit Modes of Operation

Figure 14:
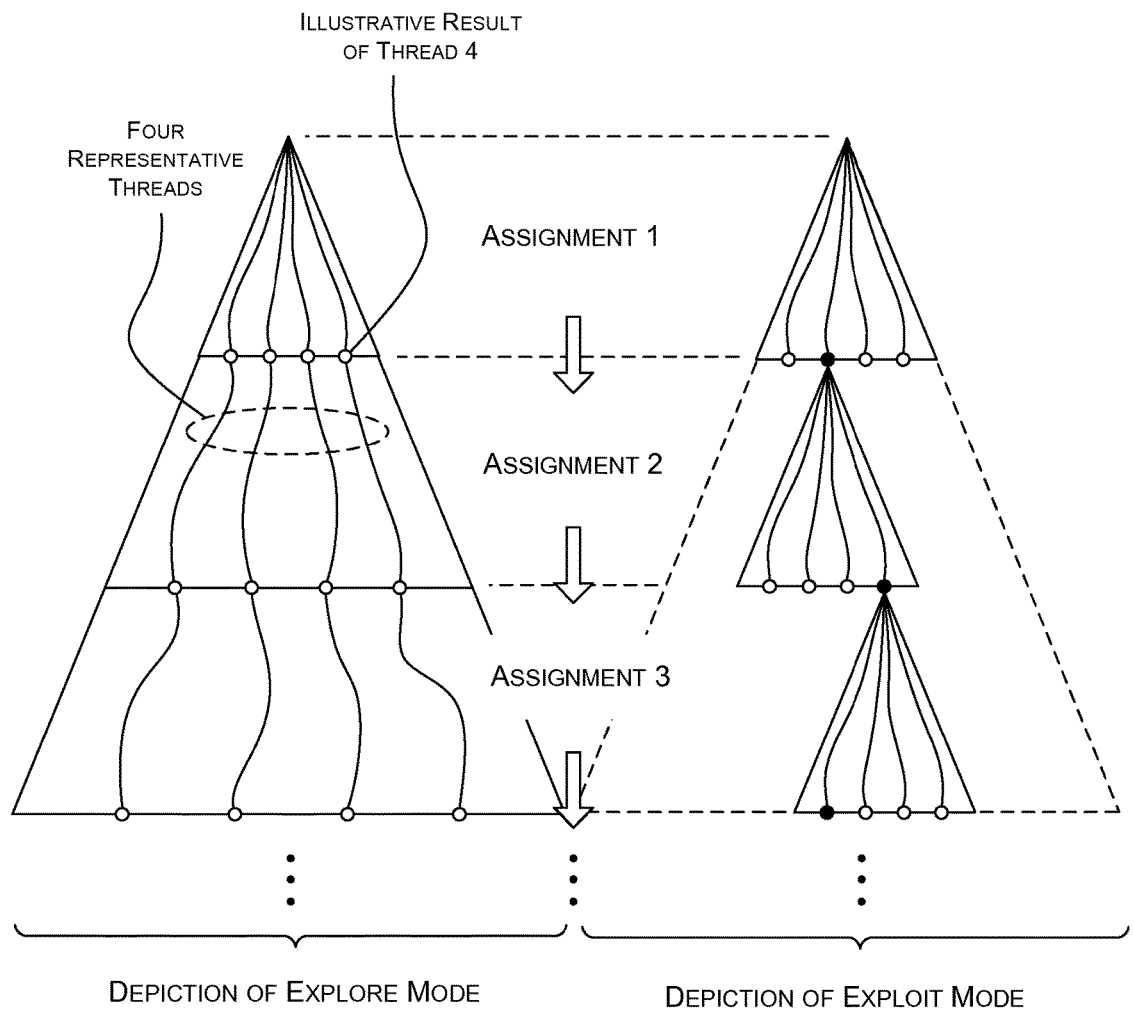
FIG. 14 depicts an explore mode and an exploit mode of operation of the RAF.

FIG. 14 summarizes two modes by which the processing elements 106 of FIG. 1 can solve an allocation problem: the explore mode and the exploit mode. In general, FIG. 14 shows two triangular-shaped envelopes; the left envelope corresponds to the explore mode while the right envelope corresponds to the exploit mode. Each envelope further depicts a plurality of assignment stages. That is, the top section of the envelopes corresponds to a first stage; the middle section corresponds to a second stage; and the bottom section corresponds to a third stage. Although only three stages are shown, the processing may involve additional stages.

In each stage, an undulating line represents the processing performed by a particular processing element, e.g., a particular GPU or multi-core CPU thread. Thus, each stage involves four processing elements working in parallel. The terminal bubble at the end of each undulating line represents a result generated by an associated processing element. The result can have different meanings in different respective contexts. In a first context, a result may represent the outcome of an attempt to assign all balls in a specified ordering of balls to a particular bin. For example, in the first stage, the processing elements attempt to assign the balls to bin0. In the second stage, the processing elements attempt to assign the balls to bin1. In the third stage, the processing elements attempt to assign the balls to bin2. In a second context, the terminal bubble may represent the outcome of an attempt to assign all balls to all possible bins. In other words, in this context, the terminal bubble represents a solution to the allocation problem, corresponding to either a complete solution (in which every ball is assigned to bins) or a partial solution (in which one or more balls remain unallocated). In the following explanation, first assume that the first context applies to the explanation of FIG. 14.

First consider the case of the explore mode, depicted in the left part of the figure. In the first top-most stage, each processing element independently attempts to fit unallocated balls into bin0, to arrive at a result that differs from the other processing elements. (To simplify explanation, assume that the processing elements compute results using the first mode of FIGS. 5-6, rather than the second mode of FIGS. 7-8, although the latter is a possible option too.) Then, in the second stage, each processing element attempts to fit the unallocated balls into bin1 to arrive at a result that differs from the other processing elements. The RAF 102 does not evaluate the results generated by the processing elements for the first stage, e.g., to choose a result among the four results that is deemed most desirable. Hence, the input condition for the second stage is not dependent on any such evaluation. The above-described process continues until the last bin, bin $b_k$, is processed. At the end of this processing, each processing element will have assigned balls to bins in a different manner than other processing elements. That is, there will be no commonality in solution, unless that commonality is achieved by luck.

Now consider the exploit mode, depicted in the right part of FIG. 14. The first top-most stage proceeds in the same as the explore mode; that is, each processing element independently attempts to fit the unallocated balls into bin0, to arrive at a result that differs from the other processing elements. The RAF 102 now picks a result, among the four results provided by the first stage, that is deemed most desirable. The most desirable solution can be defined in different ways. For example, in one case, the most desirable result may correspond to a result which places the greatest number of balls, and/or which satisfies one or more constraints deemed to be difficult to meet, etc. In the second stage, each processing elements adopts the assignment of balls to bin0 that has been judged to be the most desirable. At the end of all stages, the final solutions will have the same assignment of balls to bins for bins 0 to k−1, and different assignments for bin k.

Now consider the context in which each terminal bubble in FIG. 14 represents a complete solution, that is, representing an outcome of the processing element's attempt to assign all balls to all bins. Thus, in this context, the three stages represent three attempts by each processing element to find solutions to the allocation problem.

In the explore mode, each processing element can start afresh at the beginning of each stage, without considering the solutions provided by a previous stage. In the exploit mode, on the other hand, each processing element does take into consideration the solutions provided by a previous stage (if a previous stage exists). The RAF 102 can execute the exploit mode in different ways. In one approach, at the end of a stage, the RAF 102 can select a solution that is deemed most desirable based on any criterion or criteria. The RAF 102 can then perturb the solution in any manner, such as by removing at least one ball from at least one bin. In addition or alternatively, the RAF 102 can specify one or more constraints as more important to satisfy in the subsequent stage, compared to other constraints. The RAF 102 can then feed this input condition to all of the processing elements, asking the processing elements to again attempt to fit the unallocated balls into bins. Each processing element may attempt to find a solution by fitting the unallocated balls into the bins in a different respective order, thereby potentially producing a different solution compared to the other processing elements. Alternatively, or addition, the RAF 102 can perturb the "best" solution from a previous stage in different ways, such as by removing different sets of balls from bins and/or enforcing different sets of constraints. The RAF 102 can then feed different perturbed input conditions to different respective processing elements in the next stage.

Alternatively, or in addition, the RAF 102 can progressively increase the extent to which it perturbs the "best" solution upon encountering unsatisfactory solutions. For example, the RAF 102 can dislodge n number of balls in the second stage. If this fails to yield a satisfactory solution, the RAF 102 can dislodge n+p number of balls in the third stage, and so on. This annealing strategy may help dislodge a prior best solution from a local minimum within the search space.

The explore mode and the exploit mode have different respective advantages and potential disadvantages. The explore mode is useful because it provides a greater diversity of solutions compared to the exploit mode. Further the explore mode does not require the RAF 102 to make a choice as to which result is the most desirable after each stage (which may be a challenging decision to make without drawing on domain-specific heuristic considerations). On the other hand, the exploit mode may be useful in drilling down on a solution, particularly when the solution space only offers a few solutions. In practice, the RAF 102 can adopt any combination of processing performed according to the explore mode and the exploit mode, including the cases in which no exploit-mode processing is performed or no explore-mode processing is performed.

Figure 15:
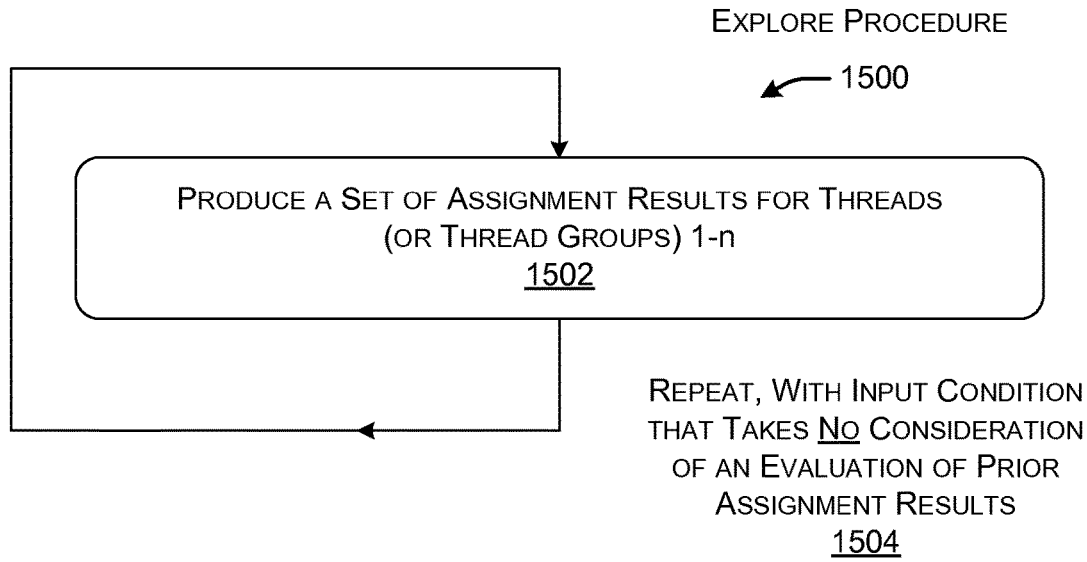
FIG. 15 is a flowchart that summarizes the operation of the RAF in the explore mode of operation.

FIG. 15 shows a procedure 1500 which summarizes the operation of the explore mode. In the sole block 1502, the RAF 102 produces a set of results for threads (or thread groups) 1 through n. As indicated in note 1504, the processing in block 1502 does not take into account an evaluation of prior assignment results produced by a previous stage (if a previous stage exists).

Figure 16:
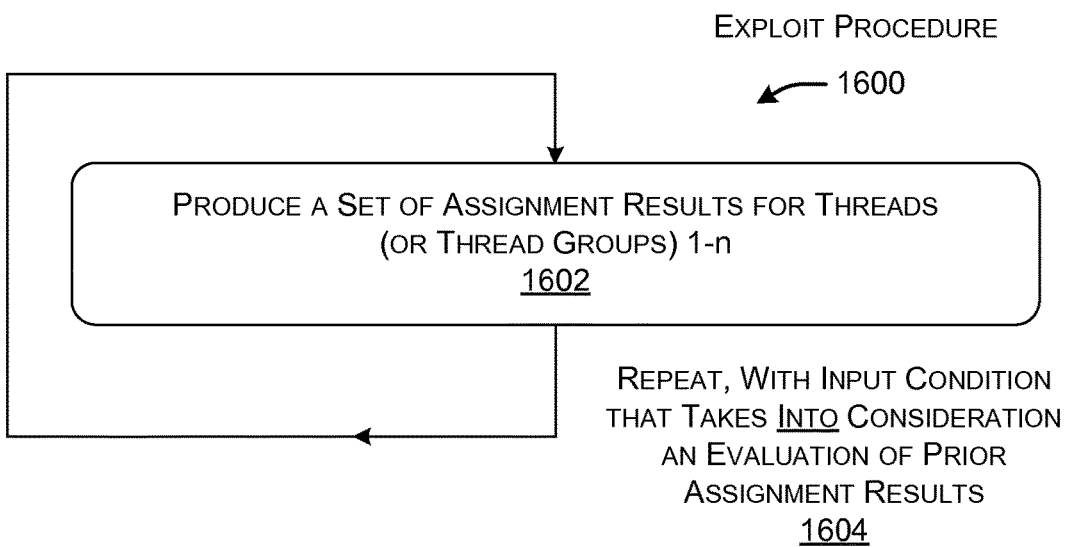
FIG. 16 is a flowchart that summarizes the operation of the RAF in the exploit mode of operation.

FIG. 16 shows a procedure 1600 which summarizes the operation of the exploit model. In the sole block 1602, the RAF 102 again produces a set of results for threads (or thread groups) 1 through n. As indicated in note 1604, the processing in block 1602 now does take into account an evaluation of assignment results produced by a previous stage (if a previous stage exists).

Figure 17:
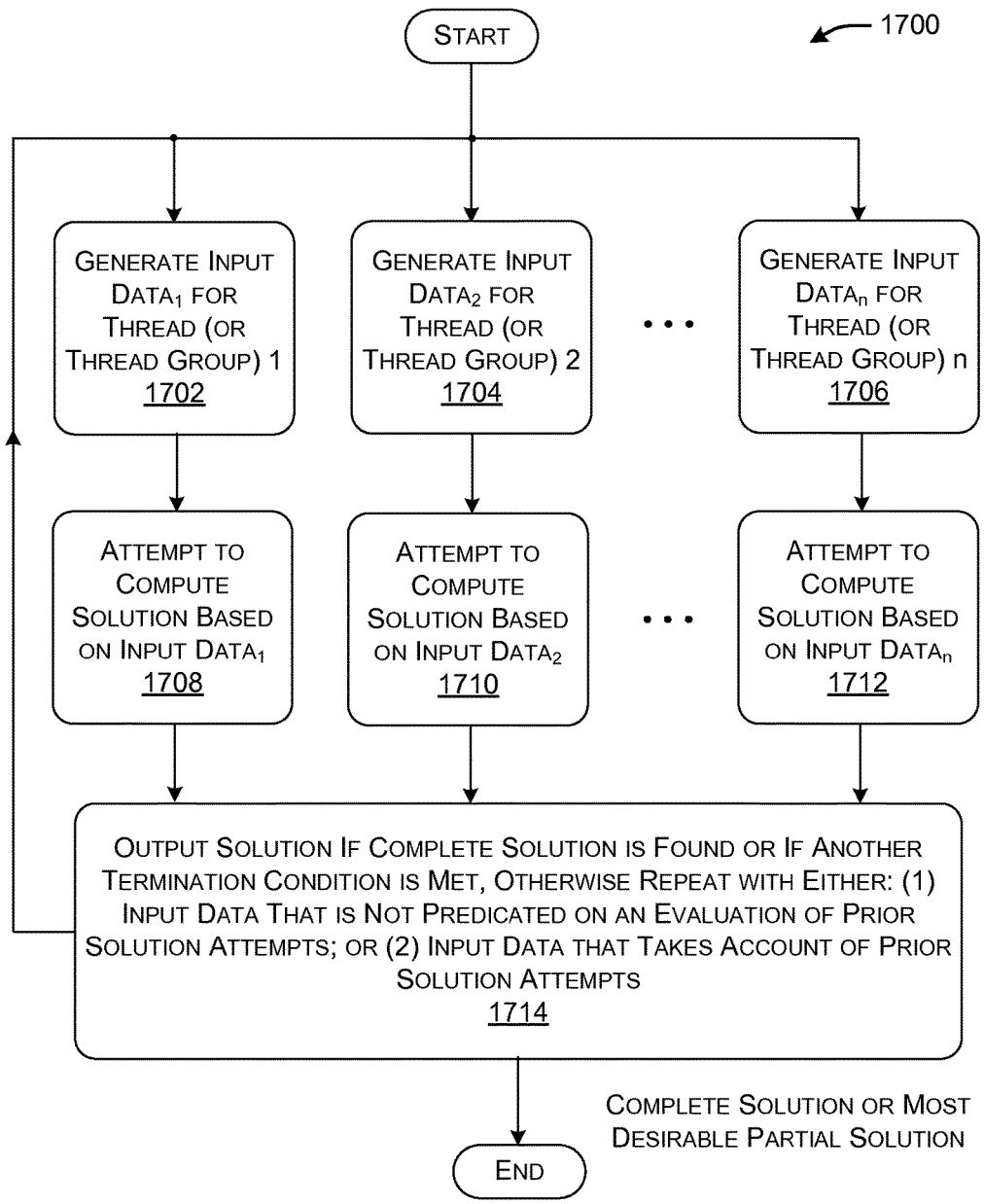
FIG. 17 is flowchart that describes one manner by which the processing elements of a problem-solving framework may work in parallel to find respective solutions to any NP-hard constraint problem.

FIG. 17 shows a procedure 1700 that provides a general overview of processing performed by a collection of threads or thread groups (e.g., GPU threads, multi-core CPU threads, or the processing elements of some other processing framework). In one case, the RAF 102 can execute the procedure 1700 to solve an allocation problem. But the procedure 1700 is not limited thereto. More generally, any problem-solving framework can use the procedure 1700 to perform parallel exploration of a solution space, including a solution space associated with any non-deterministic polynomial-time hard (NP-hard) problem in any problem domain.

Blocks 1702 and 1704 refer to processing performed by a first thread or thread group. In block 1702, the thread (or thread group) generates input data for processing. In the examples described above, this processing entails generating an ordered list of balls and/or bins. In block 1704, the thread (or thread group) attempts to compute a solution based on the input data provided in block 1702. In the examples described above, this processing entails placing balls selected from the ordering of balls into the bins selected from the ordering of bins. Blocks 1706 and 1708 correspond to the same operations performed by the second thread (or thread group). Blocks 1710 and 1712 correspond to the same operations performed by $n^{th}$ thread (or thread group).

In block 1714, after each iteration, the problem-solving framework outputs a solution. That solution may correspond to a complete solution if one is found; else, the framework outputs a partial solution. The procedure 1700 repeats until a complete solution is found or other termination condition is reached. The processing may further leverage any combination of the explore mode and exploit mode, described above.

D. Representative Computing Functionality

Figure 18:
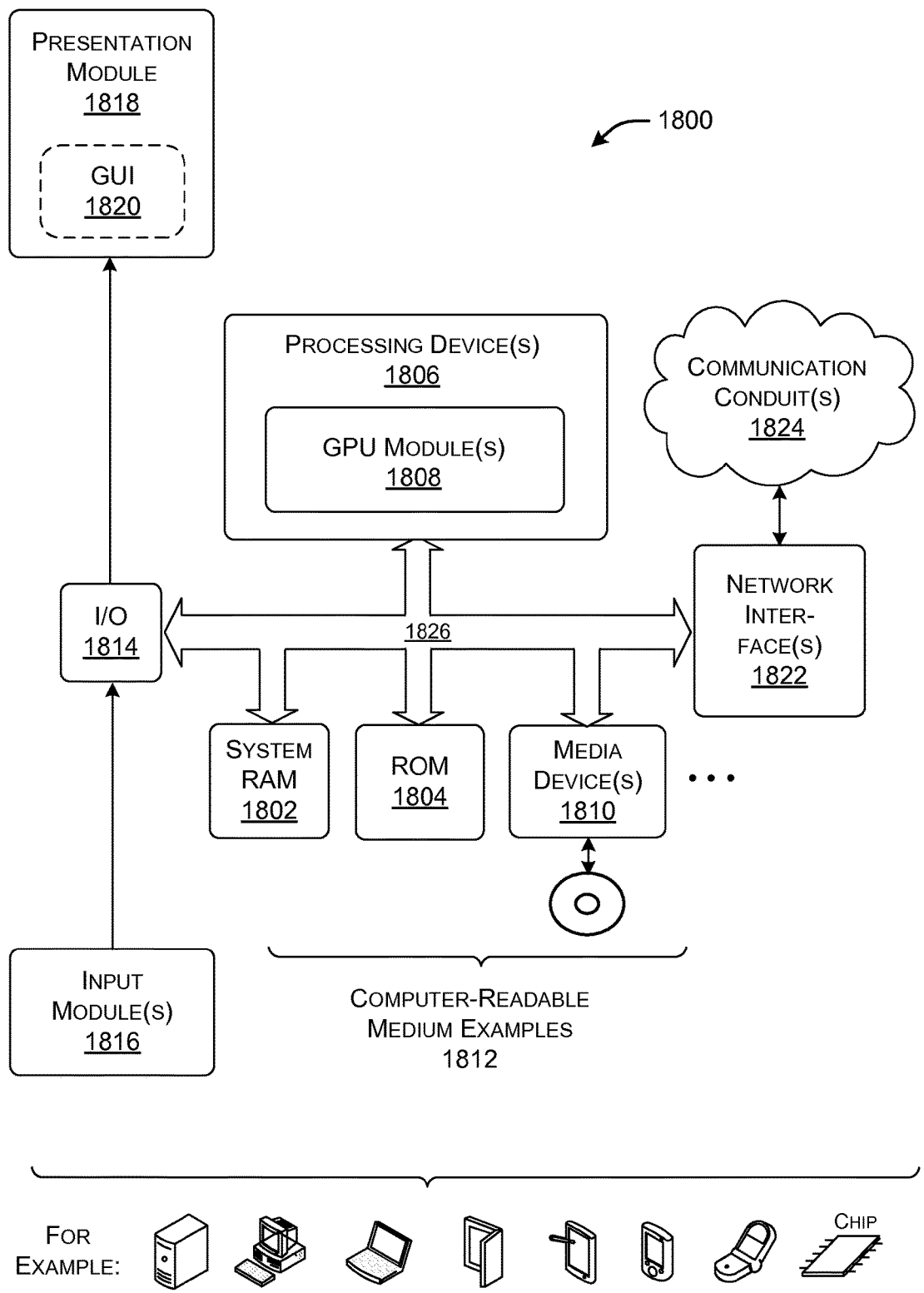
FIG. 18 shows illustrative computing functionality that can be used to implement any aspect of the features shown in the foregoing drawings.

FIG. 18 sets forth illustrative computing functionality 1800 that can be used to implement any aspect of the functions described above. For example, the type of computing functionality 1800 shown in FIG. 18 can be used to implement any aspect of the RAF 102 of FIG. 1, or any aspect of a computer device which interacts with the RAF 102. In one case, the computing functionality 1800 corresponds to a computing device that hosts some type of parallel-processing framework, such as one or more GPU modules (e.g., GPU chips), multi-core CPU(s), etc. In all cases, the computing functionality 1800 represents one or more physical and tangible processing mechanisms.

The computing functionality 1800 can include volatile and non-volatile memory, such as RAM 1802 and ROM 1804, as well as one or more processing devices 1806. For example, the processing devices 1806 may include one or more CPUs (single or multi-core) and at least one GPU module 1808. The computing functionality 1800 also optionally includes various media devices 1810, such as a hard disk module, an optical disk module, and so forth. The computing functionality 1800 can perform various operations identified above when the processing device(s) 1806 executes instructions that are maintained by memory (e.g., RAM 1802, ROM 1804, or elsewhere).

More generally, instructions and other information can be stored on any computer readable medium 1812, including, but not limited to, static memory storage devices, magnetic storage devices, optical storage devices, and so on. The term computer readable medium also encompasses plural storage devices. In all cases, the computer readable medium 1812 represents some form of physical and tangible entity.

The computing functionality 1800 also includes an input/output module 1814 for receiving various inputs (via input modules 1816), and for providing various outputs (via output modules). One particular output mechanism may include a presentation module 1818 and an associated graphical user interface (GUI) 1820. The computing functionality 1800 can also include one or more network interfaces 1822 for exchanging data with other devices via one or more communication conduits 1824. One or more communication buses 1826 communicatively couple the above-described components together.

The communication conduit(s) 1824 can be implemented in any manner, e.g., by a local area network, a wide area network (e.g., the Internet), etc., or any combination thereof. The communication conduit(s) 1824 can include any combination of hardwired links, wireless links, routers, gateway functionality, name servers, etc., governed by any protocol or combination of protocols.

Figure 19:
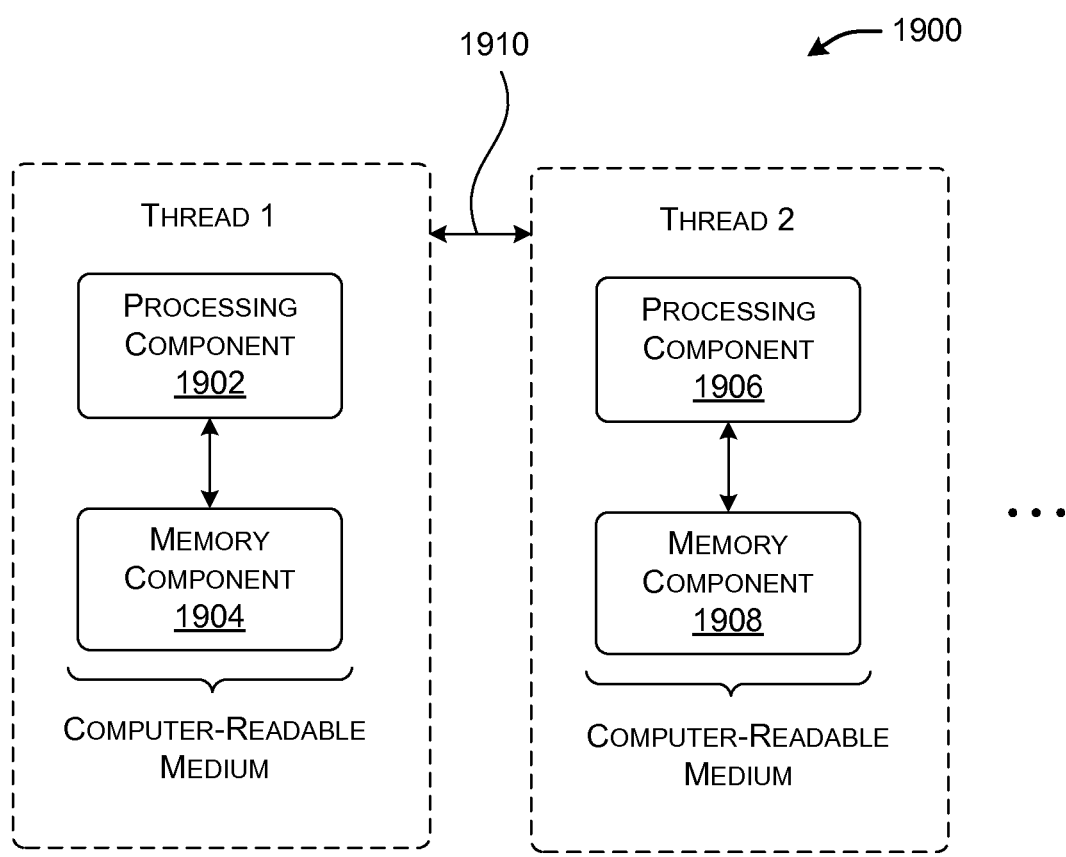
FIG. 19 shows one illustrative implementation of a graphical processing module used by the RAF.

FIG. 19 shows the details of a GPU module 1900. In one non-limiting implementation, The GPU module 1900 implements the bulk of the processing performed by the RAF 102. The GPU module 1900 may be hosted by the computing functionality 1800 of FIG. 18 (e.g., corresponding to the GPU module 1808 shown in that figure), or some other host system.

The GPU module 1900 includes plural threads (only two of which are shown for simplicity). For example, the GPU module 1900 can include 64 threads, 128 threads, etc. Thread 1 can include a processing component 1902 in conjunction with a memory component 1904. For example, the memory component 1904 may correspond to register memory, etc. Similarly, thread 2 can include a processing component 1906 in conjunction with a memory component 1908. In one implementation, each group of threads has a single instruction pointer. The GPU module 1900 drives the threads in a group in such a manner that they all execute the same instruction at the same time, but with respect to different input data. Any individual thread can throw out the result of a particular instruction if it does not need it. In one implementation, the threads in a thread group may communicate with each other in certain circumstances (as indicated by the double-headed arrow 1910).

Alternatively, or in addition, any of the functions described in the preceding sections can be performed, at least in part, by one or more other hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for allocating a set of items to a set of bins, comprising:
   using a computing device for:
   at a resource allocation framework that can be applied to different types of allocation problems, the resource allocation framework comprising one or more processing elements, receiving a specification that describes characteristics of a particular allocation problem, the specification comprising a mapping of real-world entities associated with the allocation problem to the set of items, a mapping of real-world entities associated with the allocation problem to the set of bins, and a resource vector which identifies resources associated with the allocation problem, together with capacities of the respective resources; and
   using the specification, together with the one or more processing elements of the resource allocation framework, to iteratively determine a solution which allocates the set of items to the set of bins, the specification being associated with at least a utilization function which describes, for a proposed assignment of a particular item to a particular bin, a consumption of resources associated with that proposed assignment, wherein the resource allocation framework operates using any combination of an explore mode and an exploit mode:
   in the explore mode, the input data associated with a particular iteration of a particular processing element is not dependent on an evaluation of results provided in a prior iteration; and
   in the exploit mode, the input data associated with a particular iteration of a particular processing element, other than a first iteration, is dependent on an evaluation of results provided in a prior iteration; and
   using the determined solution to allocate the real-world entities related to the set of items to the real-world entities associated with the set of bins.

2. The method of claim 1, wherein the resource vector includes one or more dimensions associated with non-shared resources.

3. The method of claim 1, wherein the resource vector includes one or more dimensions associated with shared resources.

4. The method of claim 3, wherein one shared resource is a communication link which couples two communicating entities together.

5. The method of claim 1, wherein the resource vector includes at least one conflict dimension having a conflict-checking capacity value assigned thereto.

6. The method of claim 1, wherein the specification additionally sets forth a friend relationship between at least a first item and a second item, the friend relationship prompting the resource allocation framework to attempt to assign the first item and the second item to a same bin.

7. The method of claim 1, wherein the specification additionally sets forth a foe relationship between at least a first item and a second item, the foe relationship prompting the resource allocation framework to attempt to assign the first item and the second items to different respective bins.

8. The method of claim 1, wherein the specification additionally sets forth a pinning constraint that defines a circumstance in which at least one item is pinned to at least one bin at a start of a solving operation performed by the resource allocation framework.

9. The method of claim 1, wherein the specification additionally sets forth at least one soft constraint, said at least one soft constraint describing a condition in which at least one other constraint is permitted to be violated.

10. The method of claim 1, wherein the computing functionality is implemented by a plurality of processing elements which operate in parallel to find the solution.

11. The method of claim 10, wherein each processing element operates in an independent manner from other processing elements to find a solution.

12. The method of claim 10, wherein the plurality of processing elements include respective groups of processing elements, and wherein the processing elements in each group work in cooperative fashion to find a single solution.

13. The method of claim 10, wherein the allocation problem comprises assigning virtual machines (VMs) to servers without consideration of bandwidth requirements.

14. The method of claim 10, wherein the allocation problem comprises assigning virtual machines (VMs) to servers connected by a plurality of paths.

15. The computer-implemented method of claim 1 wherein the real-world entities associated with the items are virtual machines and wherein the real-world entities associated with the bins are servers.

16. A computer-implemented domain-agnostic problem-solving system for solving a constraint problem that allocates a set of items to a set of bins, comprising:
one or more computing devices with plural processing elements comprising logic components, wherein each processing element iteratively:
generates input data associated with the constraint problem that allocates the set of items to the set of bins; and
attempts to compute a solution to the constraint problem using the domain-agnostic problem solving system and a specification tailored to the constraint problem, the specification being associated with at least a utilization function that describes, for a proposed assignment of a particular item to a particular bin, a consumption of resources associated with that proposed assignment, and the specification comprising a mapping of real-world entities associated with the constraint problem to the set of items, a mapping of real-world entities associated with the constraint problem to the set of bins, and a resource vector which identifies resources associated with the constraint problem, together with capacities of the respective resources, based on the input data
wherein the problem-solving system operates using any combination of an explore mode and an exploit mode:
in the explore mode, the input data associated with a particular iteration of a particular processing element is not dependent on an evaluation of results provided in a prior iteration; and
in the exploit mode, the input data associated with a particular iteration of a particular processing element, other than a first iteration, is dependent on an evaluation of results provided in a prior iteration.

17. The problem-solving system of claim 16, wherein the constraint problem comprises assigning virtual machines (VMs) to servers with consideration of time-varying resource allocation.

18. A computer readable storage device for storing computer readable instructions, the computer readable instructions providing a resource allocation framework that when executed by one or more processing devices cause the one or more processing devices to:
(a) provide an ordering of items;
(b) select a next bin $bin_{current}$ in an ordering of bins;
(c) select a next item $ball_{current}$ from the ordering of items;
(d) select a utilization module for a current allocation of items to bins ($alloc_{current}$), together with $bin_{current}$ and $ball_{current}$;
(e) receive a consumption vector $consume_{bin/ball}$ from the utilization module that describes a consumption of resources associated with a proposed assignment of $ball_{current}$ to $bin_{current}$;
(f) add resources associated with $consume_{bin/ball}$ to a current utilization vector $util_{current}$, $Util_{current}$ describing a current utilization of resources for a current partial assignment of items to bins; and
(g) determine whether $util_{current}$ satisfies specified constraints, and, if so, to persist a result of the adding of the resources, and, if not, to void the result of the adding of the resources,
repeating (a) through (g) for different respective items and bins until a solution is found, corresponding to a final assignment of items to bins.

19. The computer readable storage device of claim 18, wherein the resource allocation framework includes a plurality of processing elements, each processing element implementing (a) through (g), wherein each processing element attempts to find a solution independent of other processing elements.

20. The computer readable storage device of claim 18, wherein the resource allocation framework includes a plurality of groups of processing elements, wherein processing elements in a group implement at least (d) through (g) for different respective items in the ordering of items,
further comprising (h) determining whether current utilization vectors $Util_{current}$ computed by separate processing elements in a group jointly satisfy the specified constraints.

* * * * *